US011072390B2

(12) United States Patent
Nishikawa et al.

(10) Patent No.: US 11,072,390 B2
(45) Date of Patent: Jul. 27, 2021

(54) BICYCLE CONTROL APPARATUS WITH OPERATING DEVICE

(71) Applicant: Shimano Inc., Osaka (JP)

(72) Inventors: Yusuke Nishikawa, Osaka (JP); Yasuhiro Tsuchizawa, Osaka (JP); Makoto Usui, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/861,933

(22) Filed: Apr. 29, 2020

(65) Prior Publication Data

US 2020/0255088 A1    Aug. 13, 2020

Related U.S. Application Data

(63) Continuation of application No. 15/876,682, filed on Jan. 22, 2018, now Pat. No. 10,773,770, which is a
(Continued)

(30) Foreign Application Priority Data

Dec. 5, 2014  (JP) .................................. 2014-247319
Jul. 24, 2015  (JP) .................................. 2015-147177

(51) Int. Cl.
| | |
|---|---|
| *B62M 25/04* | (2006.01) |
| *B62M 6/50* | (2010.01) |
| *G01D 5/14* | (2006.01) |
| *G01D 5/34* | (2006.01) |
| *B62K 11/00* | (2006.01) |

(52) U.S. Cl.
CPC ............... *B62M 6/50* (2013.01); *B62K 11/00* (2013.01); *B62M 25/04* (2013.01); *G01D 5/145* (2013.01); *G01D 5/34* (2013.01)

(58) Field of Classification Search
None
See application file for complete search history.

(56) References Cited

U.S. PATENT DOCUMENTS 8,286,529 B2    10/2012  Tetsuka
8,738,212 B1 *  5/2014   Schieffelin ............... B62M 6/40
                                                         701/22
(Continued)

FOREIGN PATENT DOCUMENTS

DE    10 2010 016 009 A1    9/2011
EP          2 471 705 A1    7/2012
(Continued)

*Primary Examiner* — James M McPherson
(74) *Attorney, Agent, or Firm* — Global IP Counselors, LLP

(57) ABSTRACT

A bicycle control apparatus is basically provided with a controller and a communication unit. The controller includes a processor, a memory, and an I/O interface. The communication unit is connected to the controller and arranged to communicate with an external device. The controller is configured to communicate with an assist mechanism of a bicycle, where the assist mechanism includes an assist motor arranged to impart a supplemental drive force to the bicycle. The controller is programmed to set a control state and to adjust a response speed of the assist motor based on an operation of the external device.

15 Claims, 17 Drawing Sheets

Related U.S. Application Data continuation of application No. 14/945,975, filed on Nov. 19, 2015, now Pat. No. 9,908,587.

(56) References Cited

U.S. PATENT DOCUMENTS

| | | | |
|---|---|---|---|
| 9,056,651 B2 | 6/2015 | Tetsuka | |
| 9,090,304 B2 | 7/2015 | Tetsuka | |
| 2008/0111511 A1* | 5/2008 | Kang | B60L 50/53 318/461 |
| 2009/0054182 A1 | 2/2009 | Miki et al. | |
| 2009/0102408 A1 | 4/2009 | De Jesus et al. | |
| 2011/0133542 A1* | 6/2011 | Ratti | G07C 5/008 301/6.5 |
| 2012/0150377 A1* | 6/2012 | Buchheim | B62M 6/60 701/22 |
| 2012/0152033 A1 | 6/2012 | Hsiao | |
| 2013/0014607 A1 | 1/2013 | Miki et al. | |
| 2013/0311020 A1 | 11/2013 | Searles | |
| 2014/0264037 A1 | 9/2014 | Hoyt et al. | |
| 2014/0298943 A1 | 10/2014 | Hashimoto | |
| 2016/0014252 A1* | 1/2016 | Biderman | H04L 67/12 455/420 |
| 2016/0031506 A1* | 2/2016 | Lloyd | B60L 53/68 701/49 |
| 2016/0039496 A1* | 2/2016 | Hancock | G01S 19/19 701/60 |
| 2016/0056432 A1 | 2/2016 | Searles | |
| 2016/0159434 A1* | 6/2016 | Huang | B62M 6/45 701/67 |
| 2016/0258758 A1 | 9/2016 | Houston et al. | |
| 2017/0225742 A1* | 8/2017 | Hancock | B60W 30/188 |
| 2017/0291660 A1 | 10/2017 | Deleval | |

FOREIGN PATENT DOCUMENTS

| | | |
|---|---|---|
| GB | 2495617 A | 4/2013 |
| JP | 2001-122184 A | 5/2001 |
| JP | 2010-264977 A | 11/2010 |
| WO | 2006/091089 A2 | 8/2006 |

* cited by examiner

BICYCLE CONTROL APPARATUS WITH OPERATING DEVICE

CROSS-REFERENCE TO RELATED APPLICATIONS

This application claims priority to U.S. patent application Ser. No. 15/876,682, filed on Jan. 22, 2018, U.S. patent application Ser. No. 14/945,975, filed on Nov. 19, 2015, Japanese Patent Application No. 2014-247319, filed on Dec. 5, 2014 and Japanese Patent Application No. 2015-147177, filed on Jul. 24, 2015. The entire disclosures of U.S. patent application Ser. Nos. 15/876,682 and 14/945,975 and Japanese Patent Application Nos. 2014-247319 and 2015-147177 are hereby incorporated herein by reference.

BACKGROUND

Field of the Invention

This invention generally relates to a bicycle detection device, an operating device for a bicycle component comprising this detection device, and a bicycle control system comprising this operating device. More particularly, the present invention relates to a bicycle control system for a bicycle having an assist mechanism.

Background Information

A bicycle detector is conventionally known for detecting the movement of a plurality of bicycle operating devices. One example of a bicycle detector is disclosed in U.S. Pat. No. 8,286,529 in which an operating device is provided to of a transmission comprising two operating members and comprises two sensors for detecting the operation of each operating member.

SUMMARY

Generally, the present disclosure is directed to various features of a bicycle control system for a bicycle equipped with an assist mechanism that assists a manual drive force of a bicycle. In a bicycle equipped with an assist mechanism, demands on the assist mechanism may change depending on travel conditions of the bicycle. For example, it may be preferable for the assist mechanism to respond differently dependent on whether the bicycle is traveling on-road or traveling off-road. It also may be preferable to adjust a setting of the bicycle control apparatus from an external device.

One object of the present invention is to provide a bicycle control system that accommodates different demands on the assist mechanism depending on travel conditions of the bicycle. Another object of the present invention is to provide a bicycle control system that can communicate with an external device and an operating device to adjust settings affecting how the bicycle control system accommodates different demands on the assist mechanism.

In view of the state of the known technology and in accordance with a first aspect of the present disclosure, a bicycle control apparatus is provided that basically comprises a controller and a communication unit. The controller includes a processor, a memory, and an I/O interface. The communication unit is connected to the controller and arranged to communicate with an external device. The controller is configured to communicate with an assist mechanism including an assist motor arranged to impart a supplemental drive force to a bicycle. The controller is programmed to set a control state and to adjust a response speed of the assist motor based on an operation of the external device.

In accordance with a second aspect of the invention, the bicycle control apparatus of the first aspect is configured such that the communication unit has a wireless interface and performs wireless communication with the external device.

In accordance with a third aspect of the invention, the bicycle control apparatus of the first aspect is configured such that the external device includes a smartphone and the communication unit has a wireless interface and performs wireless communication with the smartphone.

In accordance with a fourth aspect of the invention, the bicycle control apparatus of the first aspect is configured such that a correction coefficient and a time constant can be selected or set with the external device.

In accordance with a fifth aspect of the invention, the bicycle control apparatus of the first aspect is configured such that the controller is programmed to alternately set a first control state or a second control state as the control state, and to control the assist motor such that an output state of the assist motor with respect to a manual drive force of the bicycle is different in the first control state than in the second control state.

In accordance with a sixth aspect of the invention, the bicycle control apparatus of the fifth aspect is configured to further comprise an operating device configured to be operated by a user, and the controller is arranged and programmed to communicate with the operating device and alternately set the first control state or the second control state in response to operation of the operating device.

In accordance with a seventh aspect of the invention, the bicycle control apparatus of the fifth aspect is configured such that the controller is programmed to selectively set the first control state or the second control state in response to operation of an operating device.

In accordance with an eighth aspect of the invention, the bicycle control apparatus of the first aspect is configured such that the response speed is a speed at which the assist motor responds to a decrease of the manual drive force.

In accordance with a ninth aspect of the invention, the bicycle control apparatus of the first aspect is configured such that the response speed is a speed at which the assist motor responds to an increase of the manual drive force.

With the bicycle control apparatus of the above-mentioned aspects, the assist motor of the assist mechanism can be controlled to respond differently depending on the control state, and a response speed of the assist motor can be adjusted based on an operation of the external device. In this way, the assist mechanism can be controlled in accordance with a travel condition of the bicycle, and the response speed can be adjusted by a user from the external device. Additionally, the external device can be a smartphone.

Also other objects, features, aspects and advantages of the bicycle control apparatus will become apparent to those skilled in the art from the following detailed description, which, taken in conjunction with the annexed drawings, discloses preferred embodiments of the bicycle control apparatus, which is used to control an assist motor of an assist mechanism of a bicycle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
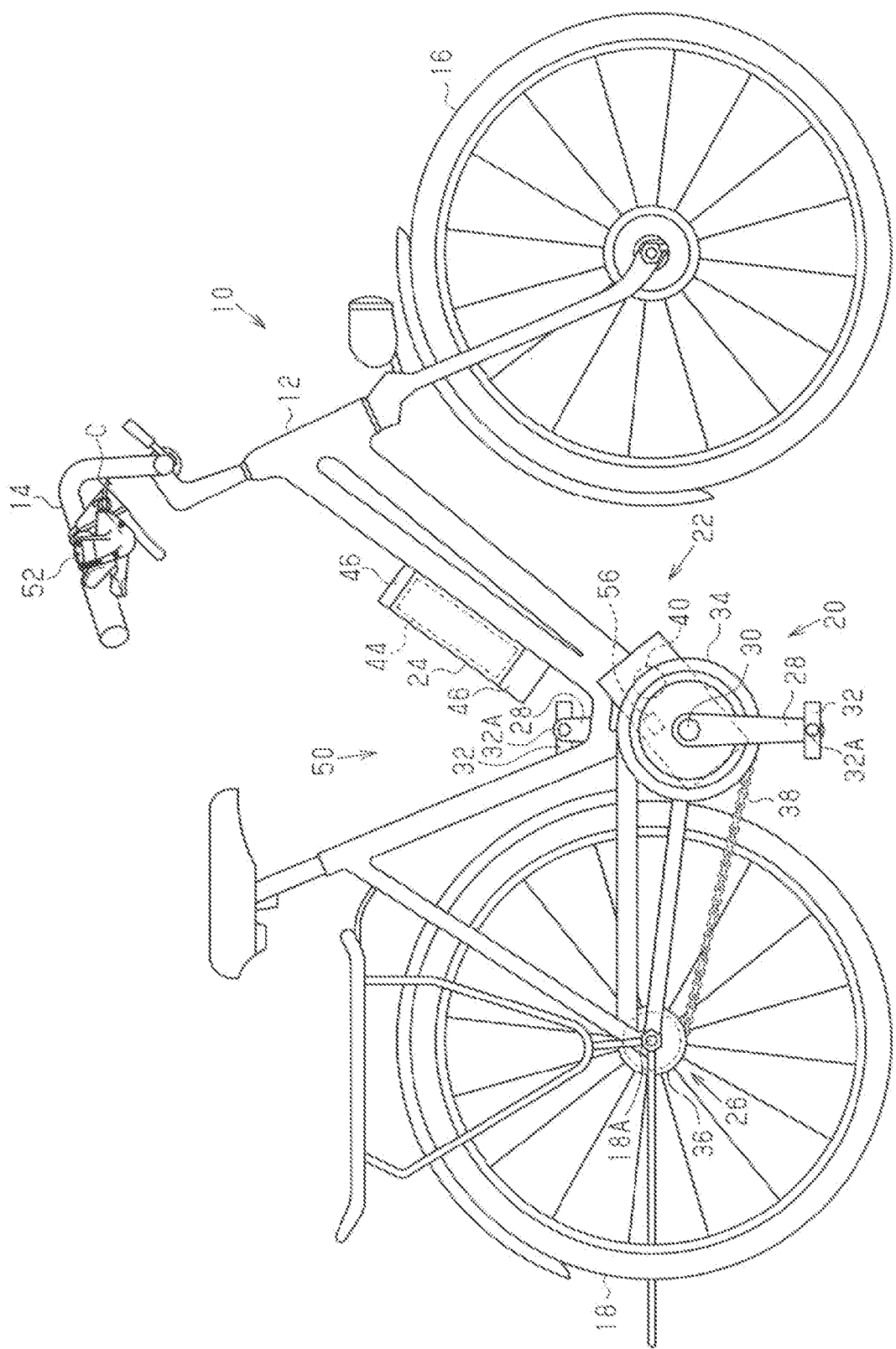
FIG. 1 is a side elevational view of a bicycle that is equipped with a bicycle control system in accordance with a first embodiment.

Referring initially to FIG. 1, a bicycle 10 is illustrated that is equipped with a bicycle control system in accordance with a first embodiment. The bicycle 10 basically comprises a frame 12, a handlebar 14, a front wheel 16, a rear wheel 18, a drive mechanism 20, an assist mechanism 22, a battery unit 24, a gear shifting device 26 (e.g. a bicycle component), a torque sensor 48 (see FIG. 8) and a bicycle control system 50.

The drive mechanism 20 comprises a pair of (left and right) crank arms 28, a crankshaft 30, a pair of (left and right) pedals 32, a front sprocket 34, a rear sprocket 36 and a chain 38. The left and right crank arms 28 are fixed to opposite ends of a crankshaft 30 that is rotatably supported to the frame 12. The left and right crank arms 28 are rotatably attached to the frame 12 via the crankshaft 30. The pedals 32 are attached to the crank arms 28 such that each of the pedals 32 is rotatably disposed around a pedal shaft 32A.

The front sprocket 34 is coupled to the crankshaft 30. The front sprocket 34 is provided coaxially with the crankshaft 30. The front sprocket 34 can be coupled so as to not rotate relatively with the crankshaft 30 or via a one-way clutch (not shown in the drawings) so that the front sprocket 34 will roll forward when the crankshaft 30 rolls forward.

The rear sprocket 36 is rotatably attached around an axle 18A of the rear wheel 18. The rear sprocket 36 is coupled with the rear wheel 18 via a one-way clutch. The chain 38 is wrapped onto the front sprocket 34 and the rear sprocket 36. When the crank arm 28 rotates due to the manual drive force that is applied to the pedal 32, the rear wheel 18 is rotated by the front sprocket 34, the chain 38 and the rear sprocket 36.

Figure 8:
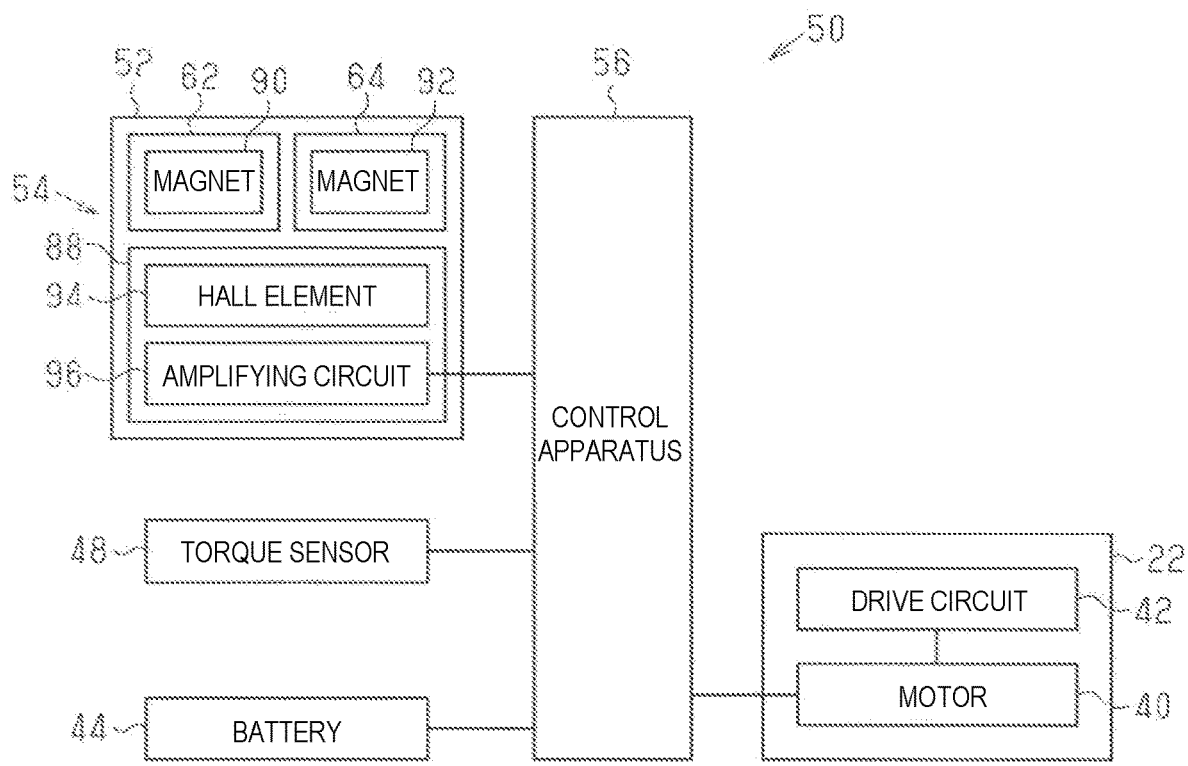
FIG. 8 is a simplified block diagram of the bicycle control system illustrated in FIG. 1.

The assist mechanism 22 comprises a motor 40 that is a bicycle electric component and a drive circuit 42 (see FIG. 8). The assist mechanism 22 assists the manual drive force that rotates the front sprocket 34 with the drive of the motor 40. The assist mechanism 22 drives the motor 40 according the manual drive force that is detected by the torque sensor 48 (see FIG. 8). The motor 40 is an electric motor. The rotation of the motor 40 is transmitted to the front sprocket 34 via a reduction gear, which is not shown. A one-way clutch (not shown in the drawings) can be provided between the motor 40 and the front sprocket 34 for preventing the motor from being rotated by the manual drive force when the crank arm 28 rolls forward.

The battery unit 24 comprises a battery 44 and a battery holder 46 for detachably attaching the battery 44 to the frame 12. The battery 44 includes one or a plurality of battery cells. The battery 44 is configured as a secondary battery. The battery 44 is electrically connected to the motor 40 and supplies electric power to the motor 40.

Figure 2:
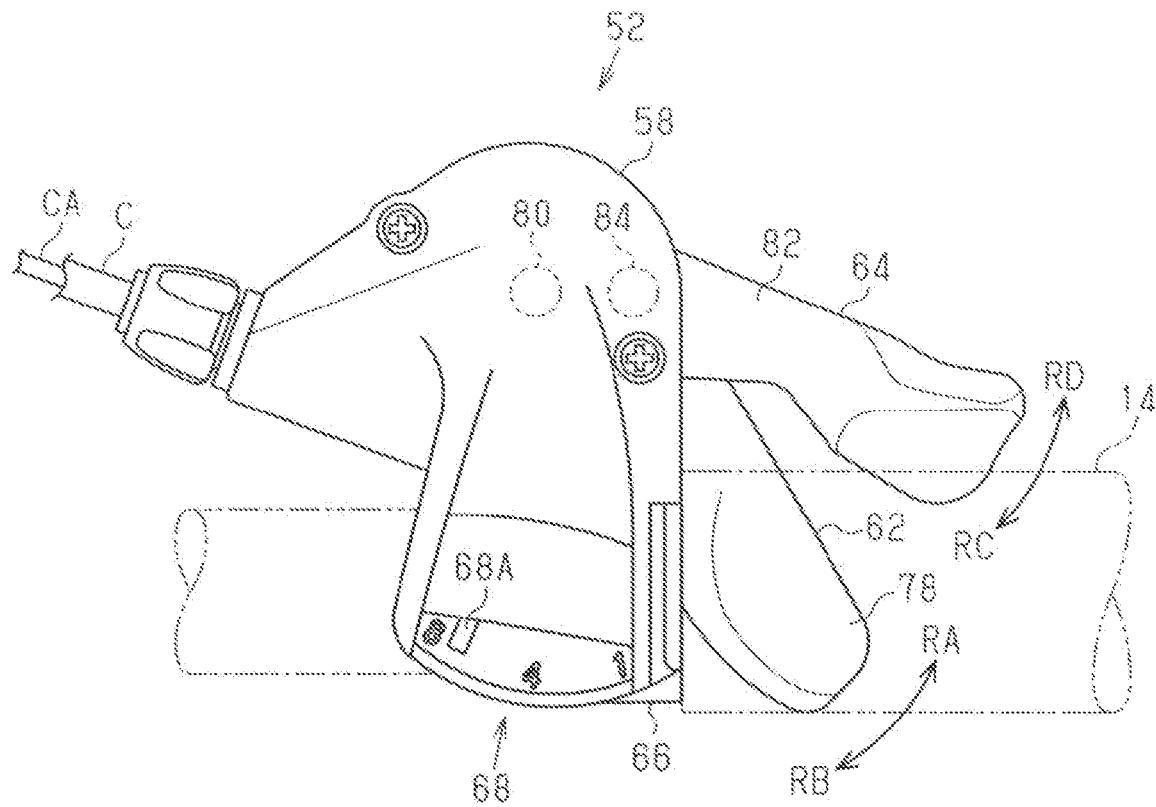
FIG. 2 is a top plan view of an operating device (i.e., a shift operating device) of the bicycle illustrated in FIG. 1.

The gear shifting device 26 shifts the input rotation to the rear sprocket 36 and transmits this to the rear wheel 18. The gear shifting device 26 is an internal transmission that is integrated with a hub of an axle 18A of the rear wheel 18. On the inside, the gear shifting device 26 comprises a planetary gear mechanism, which is not shown. As shown in FIG. 2, one end of an inner cable CA of a cable C is wound onto the gear shifting device 26 for gear shifting. A mechanical element inside of the gear shifting device 26 is rotated by a movement of the inner cable CA. With this arrangement, the connection state of the gears of the planetary gear mechanism changes, and the gear ratio of the bicycle 10 changes in a stepwise manner.

The bicycle control system 50 comprises an operating device 52, a detection device 54 (see FIG. 4) and a control apparatus 56. The operating device 52 is operatively connected to the gear shifting device 26 by the cable C for operating the gear shifting device 26. The control apparatus 56 comprises, for example, a microcomputer having at least one processor with one or more control programs (software) stored in a storage unit (at least one memory device).

As shown in FIG. 2, the operating device 52 comprises a case or housing 58, a main body portion 60, a first operating member 62 and a second operating member 64. The case 58 is fixed to the handlebar 14. The main body portion 60 is housed in the case 58 (see FIG. 3), and constitutes an internal support structure for the parts of the shifting mechanism. The first operating member 62 is movably mounted to the main body portion 60 between a rest position and an operated position. Likewise, the second operating member 64 is movably mounted to the main body portion 60 between a rest position and an operated position.

Figure 3:
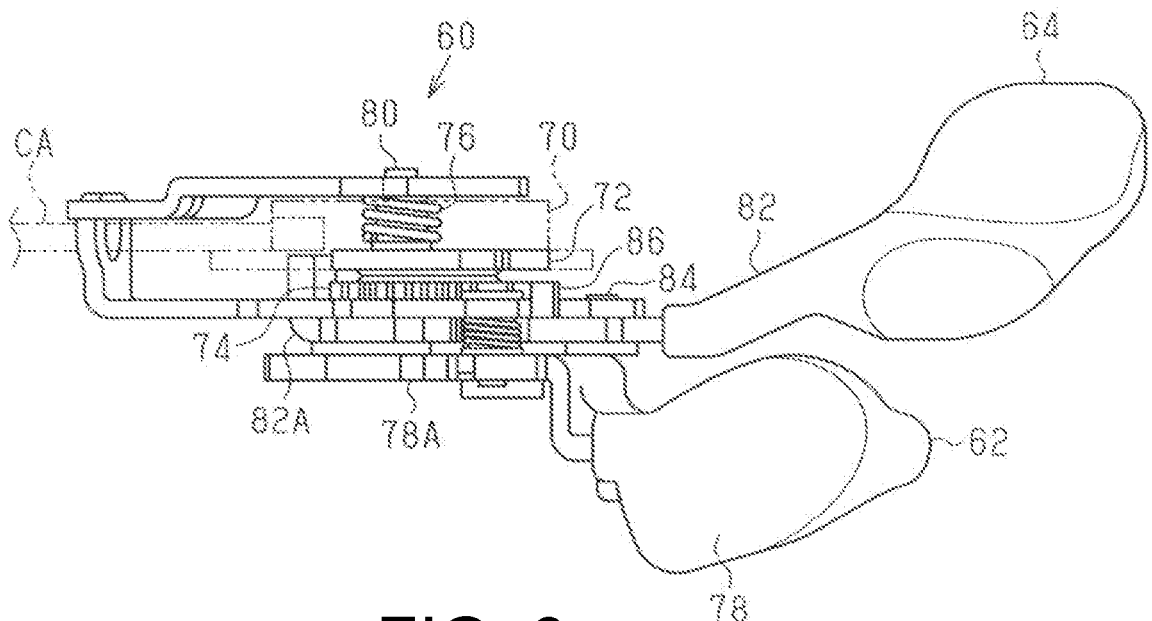
FIG. 3 is a side elevational view of the operating device illustrated in FIG. 2 with the case or housing removed.

As shown in FIG. 2, the case 58 comprises a holder 66 (i.e., a handlebar clamp in the illustrated embodiment) and a display unit 68 (i.e., a gear positon indictor in the illustrated embodiment). As shown in FIG. 3, the main body portion 60 comprises a winding body 70, a first ratchet 72, a second ratchet 74 and a biasing member 76. The holder 66 is detachably attached to the handlebar 14. The display unit 68 is configured to show the current shift position. An indicator 68A of the display unit 68 is linked with the winding body 70 of the main body portion 60 (see FIG. 3).

As shown in FIG. 3, the winding body 70 is configured to pull and release the inner cable CA. The first ratchet 72, the second ratchet 74 and the biasing member 76 are coupled to the winding body 70 for regulating the rotation of the winding body 70. One end portion of the inner cable CA is fitted to a cable connection of the winding body 70 so that the one end portion of the inner cable CA is fixed to the winding body 70. The other end portion of the inner cable CA is fitted to a cable connection of the gear shifting device 26 so that the other end portion of the inner cable CA is fixed to the gear shifting device 26.

The first ratchet 72 is a disk-shaped or fan-shaped member. The first ratchet 72 comprises a plurality of ratchet teeth on its outer peripheral surface. The second ratchet 74 is a disk-shaped or fan-shaped member. The second ratchet 74 comprises a plurality of ratchet teeth on its outer peripheral surface. The first ratchet 72 and the second ratchet 74 are superimposed (stacked in an axial direction with respect to an axis of rotation of the winding body 70. The first ratchet 72 and the second ratchet 74 are fixedly coupled to the winding body 70. Thus, the first ratchet 72 and the second ratchet 74 move as a unit with the winding body 70 in one rotational direction or the other. The biasing member 76 is, for example, a coil spring that is coupled between the main body portion 60 and the winding body 70. The biasing member 76 applies a biasing force on the winding body 70 in one rotational direction that corresponds to releasing the inner cable CA with respect to the case 58.

The first operating member 62 moves the winding body 70 in a first rotational direction. The first operating member 62 is an operating member for upshifting. The first operating member 62 comprises an operating lever 78 and a lever shaft 80. The lever shaft 80 is mounted to the main body portion 60 and pivotally supports the lever 78 on the main body portion 60. The lever shaft 80 extends through a proximal end portion 78A of the lever 78. The lever 78 rotates about a center longitudinal axis of the lever shaft 80. The lever shaft 80 is provided coaxially with the rotational axis of the winding body 70. The first ratchet 72 and the second ratchet 74 rotate about the center longitudinal axis of the lever shaft 80.

In the illustrated embodiment, the lever 78 has a pulling pawl (not shown) pivotally mounted on a proximal end portion 78A of the lever 78. The pulling pawl is biased towards the first ratchet 72. If the first operating member 62 is operated from a reference (rest or neutral) position in a first direction RA about the lever shaft 80 (see FIG. 2), and if the operation angle of the lever 78 becomes equal to or greater than a prescribed angle, then the pulling pawl (not shown) engages a tooth of the first ratchet 72 to rotate the first ratchet 72 rotates in the first rotational direction. The winding body 70 is thereby rotated in the first rotational direction, and the inner cable CA is pulled or wound. Accordingly, the inner cable CA is pulled back to the operating device 52, and the shift position of the gear shifting device 26 (FIG. 1) is changed. The main body portion 60 has a holding pawl (not shown) pivotally mounted on the main body portion 60 for holding the rotational position of the winding body 70. The holding pawl selectively engages the teeth on the outer periphery of the second ratchet 74. A biasing member (not shown in the drawings) is attached to the lever shaft 80. The biasing member is, for example, a coil spring or a plate spring. The biasing member imparts a biasing force onto the first operating member 62 toward a second direction RB of the lever shaft 80, which is opposite of the first direction RA (see FIG. 2). Accordingly, the first operating member 62 is biased in the second direction RB of the lever shaft 80, and returns to the reference (rest or neutral) position when not being operated.

The second operating member 64 moves the winding body 70 in a second rotational direction that is opposite the first rotational direction. The second operating member 64 is an operating member for downshifting. The second operating member 64 comprises an operating lever 82, a lever shaft 84 and a release mechanism 86. The lever shaft 84 is mounted to the main body portion 60 and pivotally supports the lever 82 on the main body portion 60. The lever shaft 84 is offset from the lever shaft 80. The lever shaft 84 is arranged in a position that is parallel to the lever shaft 80. The lever shaft 84 extends through a proximal end portion 82A of the lever 82. The lever 82 rotates about a center longitudinal axis of the lever shaft 84. The release mechanism 86 is supported by the proximal end portion 82A. The release mechanism 86 is provided adjacent the outer periphery of the second ratchet 74. The release mechanism 86 is configured to disengage the holding pawl from the second ratchet 74.

If the second operating member 64 is operated from a reference (rest or neutral) position in a third direction RC about the lever shaft 84 (see FIG. 2), and if the operation angle of the lever 82 becomes equal to or greater than a prescribed angle, the engagement between the holding pawl and the second ratchet 74 is released by the release mechanism 86. Thus, the second ratchet 74 is freed to move in the second rotational direction along with the winding body 70 by the biasing member 76. The winding body 70 thereby rotates in the second rotational direction, and the inner cable CA is fed or releases. Accordingly, the inner cable CA is released to the gear shifting device 26 shown in FIG. 1, and the shift position of the gear shifting device 26 is changed. The holding mechanism holds the winding body 70 in a position where the winding body 70 has been rotated a rotational amount of one gear. A biasing member (not shown in the drawings) is attached to the lever shaft 84. The biasing member is, for example, a coil spring or a plate spring. The biasing member imparts a force to the second operating member 64 toward a fourth direction RD of the lever shaft 84, which is opposite of the third direction RC (see FIG. 2). Accordingly, the second operating member 64 is biased in the fourth direction RD of the lever shaft 84 and returns to the reference (rest or neutral) position when not being operated.

The directions in which the first operating member 62 and the second operating member 64 are operated from the reference (rest or neutral) position are configured to be opposite directions of each other. That is, the gear is shifted by the rider pressing the first operating member 62 and pulling the second operating member 64. The directions in which the first operating member 62 and the second operating member 64 are operated from the reference (rest or neutral) position can also be the same direction. That is, the configuration can be such that the gear is shifted by the rider pressing in the case of both the first operating member 62 and the second operating member 64. The mechanism to operate the winding body 70 of the operating device 52 is not limited to the configuration described above, and various configurations can be employed.

Figure 4:
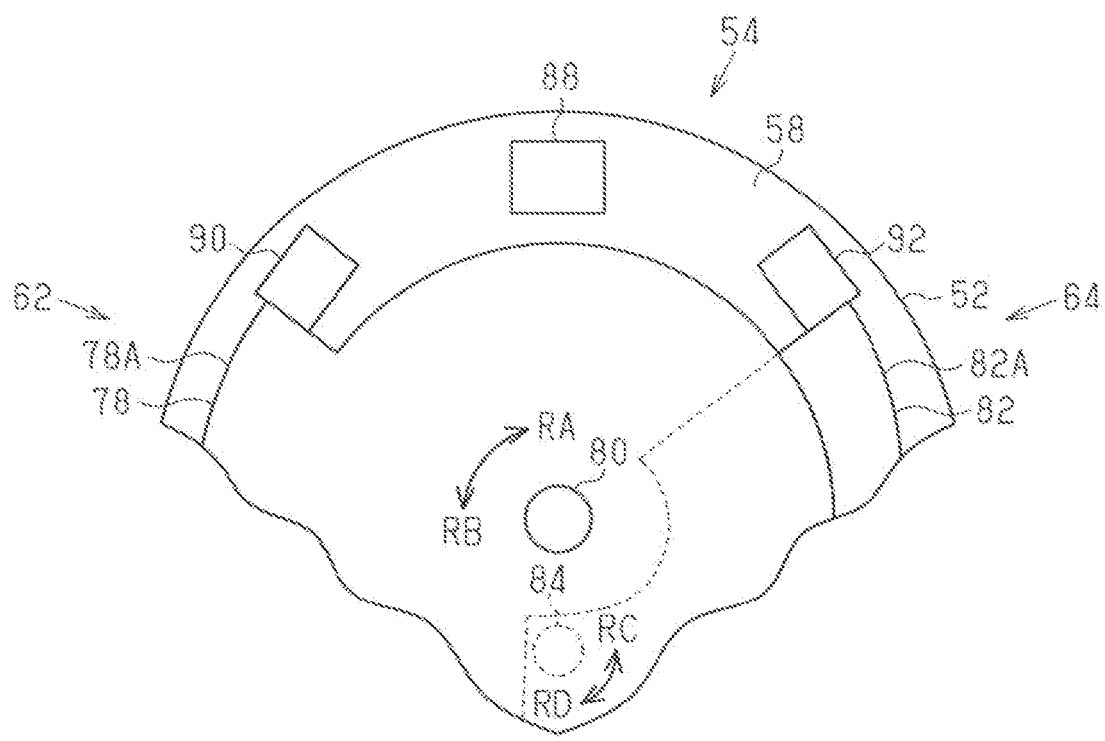
FIG. 4 is a schematic diagram of a portion of the operating device illustrated in FIGS. 2 and 3 with the first operating member and the second operating member of the operating device (i.e., the shift operating device) in reference positions with respect to a bicycle detection device.

As shown in FIG. 4, the detection device 54 is provided to the operating device 52. The detection device 54 is electrically connected to the control device 56 (see FIG. 8). The detection device 54 outputs a detection signal in response to the movement of the operating members 62 and 64. The detection device 54 comprises a single sensor 88, a first detector 90, and a second detector 92. As used herein, the term "detector" refers to an element that is detected by the single sensor 88.

As shown in FIG. 4, the sensor 88 is disposed inside of the case 58. As shown in FIG. 8, the sensor 88 comprises a Hall element 94 and an amplifier circuit 96. The sensor 88 outputs an output voltage V corresponding to the size of the magnetic flux density that is applied to the Hall element 94. The increase/decrease of the signal that is output from the Hall element 94 is reversed depending on the direction of the magnetic pole that is applied to the Hall element 94. The Hall element 94 is a so-called linear Hall element.

Figure 5:
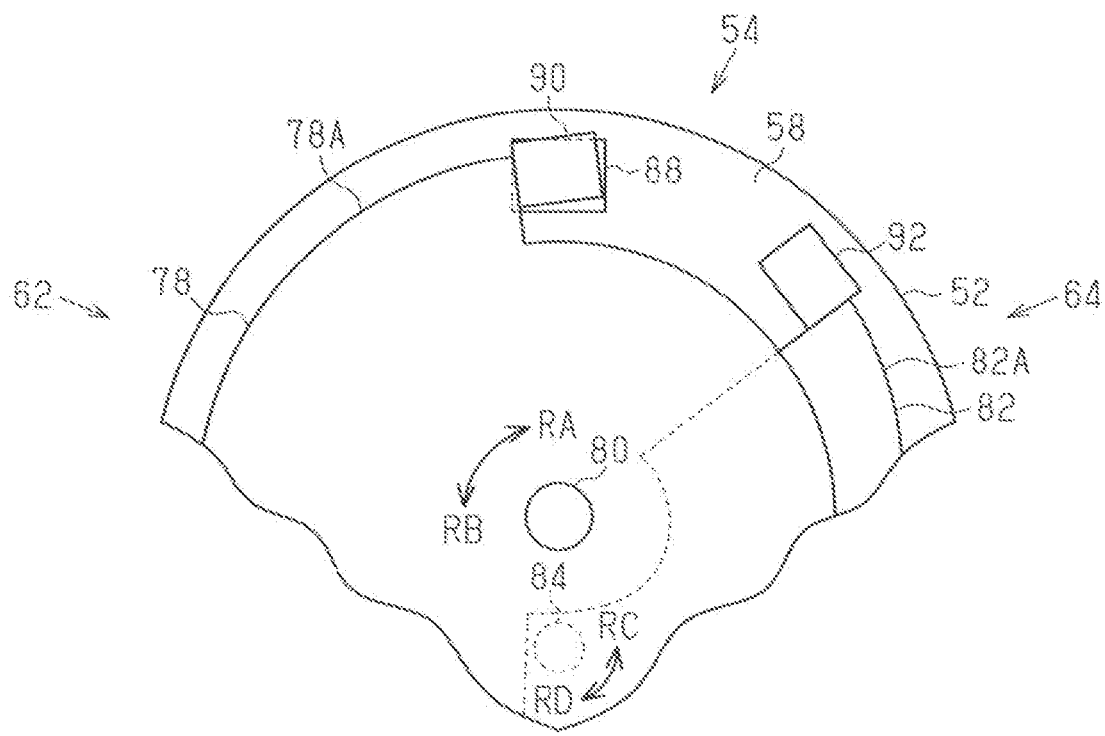
FIG. 5 is a schematic diagram of the portion of the operating device illustrated in FIG. 4 with the first operating member of the operating device in an operated position and the second operating member in the reference position.

The first detector 90 is a magnet. The first detector 90 is provided to a proximal end portion 78A of the lever 78. As shown in FIG. 4, the first detector 90 is disposed on the edge of the proximal end portion 78A. The first detector 90 moves in the first direction RA when the lever 78 is operated by the rider, as shown in FIG. 5. The first detector 90 moves in the second direction RB by the force of a spring (not shown in the drawings). The first detector 90 returns to the reference position shown in FIG. 4 when the lever 78 is released by the rider.

Figure 6:
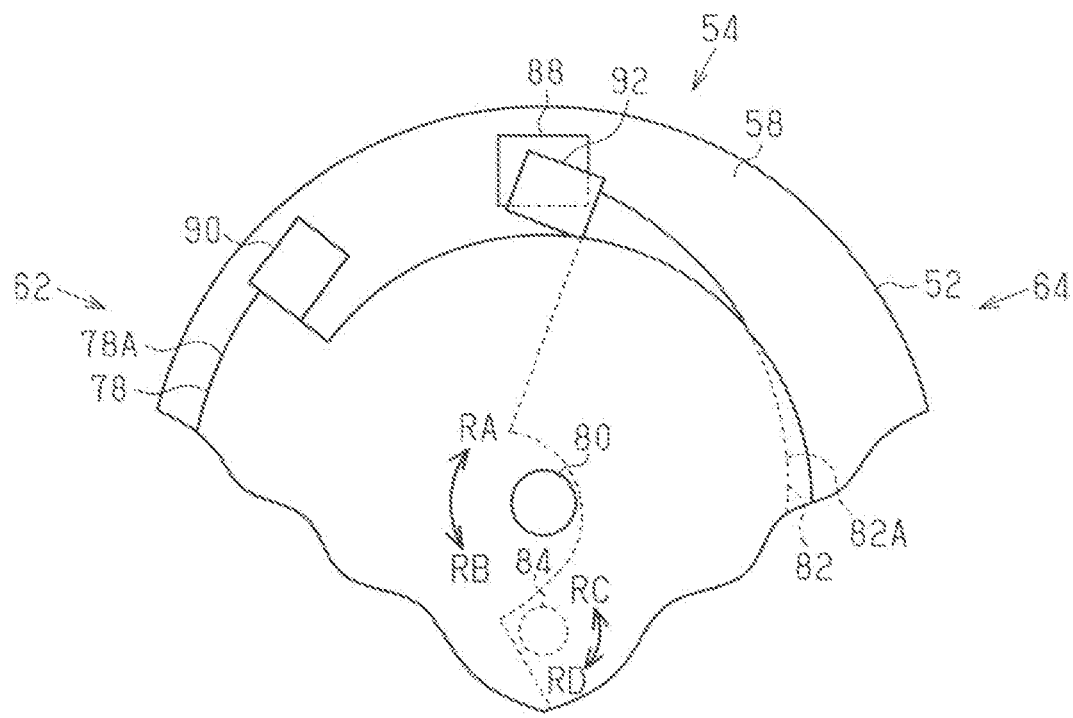
FIG. 6 is a schematic diagram of the portion of the operating device illustrated in FIGS. 4 and 5 with the first operating member of the operating device in the reference position and the second operating member in an operated position.

The second detector 92 is a magnet. The second detector 92 is provided to a proximal end portion 82A of the lever 82. As shown in FIG. 4, the second detector 92 is disposed on the edge of the proximal end portion 82A. The second detector 90 moves in the third direction RC when the lever 82 is operated by the rider, as shown in FIG. 6. The second detector 90 moves in the fourth direction RD by the force of a spring (not shown in FIG. 3). The second detector 90 returns to the reference position shown in FIG. 4 when the lever 82 is released by the rider.

The first detector 90 and the second detector 92 are disposed sandwiching a sensor 88 in their reference positions, as viewed perpendicular to the axis of rotation of the levers 78 and 82 when the levers 78 and 82 are not being operated. The magnetic pole of the first detector 90 that is on the side closer to the sensor 88 and the magnetic pole of the second detector 92 on the side closer to the sensor 88 have opposite magnetisms.

Figure 7:
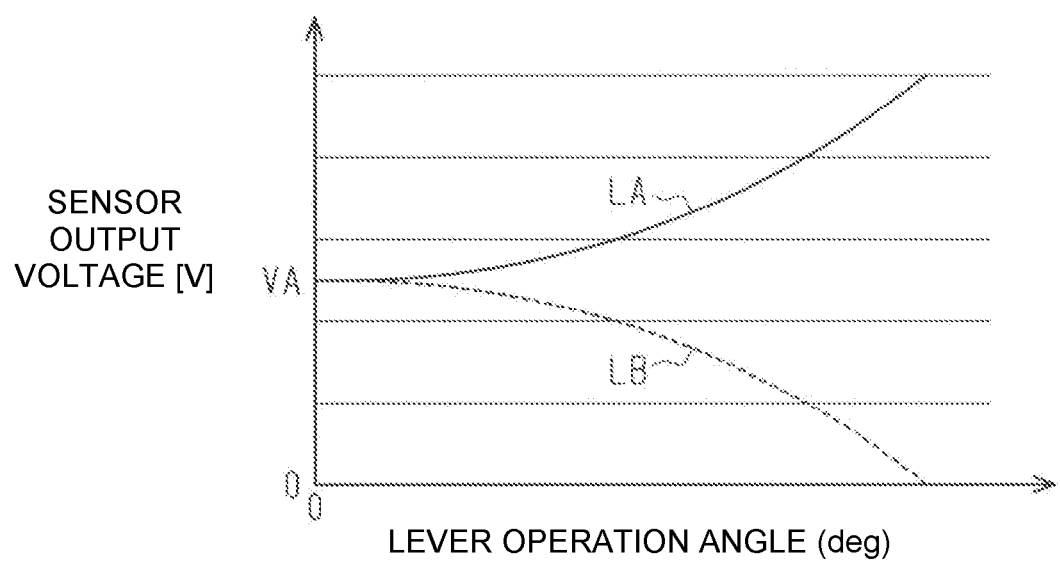
FIG. 7 is a graph showing a relationship between sensor output voltage and lever operation angle for the bicycle detection device illustrated in FIG. 4.

As shown in FIG. 7, when the first detector 90 and the second detector 92 are in the reference positions, the sensor 88 outputs the sensor output voltage V that corresponds to a reference voltage VA.

A first distance between the sensor 88 and the first detector 90 decreases as the lever operation angle from the reference position of the first operating member 62 increase. In other words, the more the lever 78 is rotated from the reference position in the first direction RA, the first distance between the sensor 88 and the first detector 90 becomes smaller. Consequently, as shown by the solid line LA in FIG. 7, the sensor output voltage V increases as the lever operation angle of the first operating member 62 increases. Accordingly, a first level of a first detection signal of the first state, which is output by the sensor 88, continuously increases as the output voltage becomes increases in a greater than the reference voltage VA. When the first detector 90 is in the reference position, the first distance between the sensor 88 and the first detector 90 is equal to or greater than a first prescribed distance. When the distance from the first detector 90 is equal to or greater than the first prescribed distance, the sensor 88 outputs the reference voltage VA. When the first detection signal of the first state, which is output by the sensor 88, becomes equal to or greater than a first threshold value that is set in advance, the control apparatus 56 determines that the first gear changing signal SA has been detected. If the first detection signal of the first state is less than the first threshold value that is set in advance, then the control apparatus 56 determines that the first gear changing signal SA has not been detected. The first threshold value set in advance is set to be adjustable.

The second distance between the sensor 88 and the second detector 92 decreases as the lever operation angle from the reference position of the second operating member 64 increases, that is, the more the lever 82 is rotated from the reference position in the third direction RC. Additionally, the magnetic pole of the first detector 90 that is on the side closer to the sensor 88 and the magnetic pole of the second detector 92 on the side closer to the sensor 88 have opposite magnetisms. Consequently, as shown by the dashed line LB in FIG. 7, the sensor output voltage V decreases as the lever operation angle of the second operating member 64 increases. Accordingly, a second level of the second detection signal of the second state, which is output by the sensor 88, continuously decreases as an output voltage that is less than the reference voltage VA. When the second detector 92 is in the reference position, the second distance between the sensor 88 and the second detector 92 is equal to or greater than a second prescribed distance. When the distance from the second detector 92 is equal to or greater than the second prescribed distance, the sensor 88 outputs the reference voltage VA. When the detection signal of the second state, which is output by the sensor 88, becomes less than or equal to a second threshold value that is set in advance, the control apparatus 56 determines that a second gear changing signal SB has been detected. If the second detection signal of the second state exceeds the second threshold value that is set in advance, the control apparatus 56 determines that the second gear changing signal SA has not been detected. The second threshold value set in advance is set to be adjustable.

As shown in FIG. 1, the drive force from the crank arm 28 and the drive force from the motor 40 are input into the gear shifting device 26. When changing the shift position, the gear shifting device 26 changes the connection state (gear ratio) of the gears of the planetary gear mechanism by operating a mechanical element that is moved by the inner cable CA. As a higher torque is input into the gear shifting device 26, the mechanical element becomes more difficult to operate. For this reason, the control apparatus 56 controls the motor 40 based on the output signal of the detection device 54.

Figure 9:
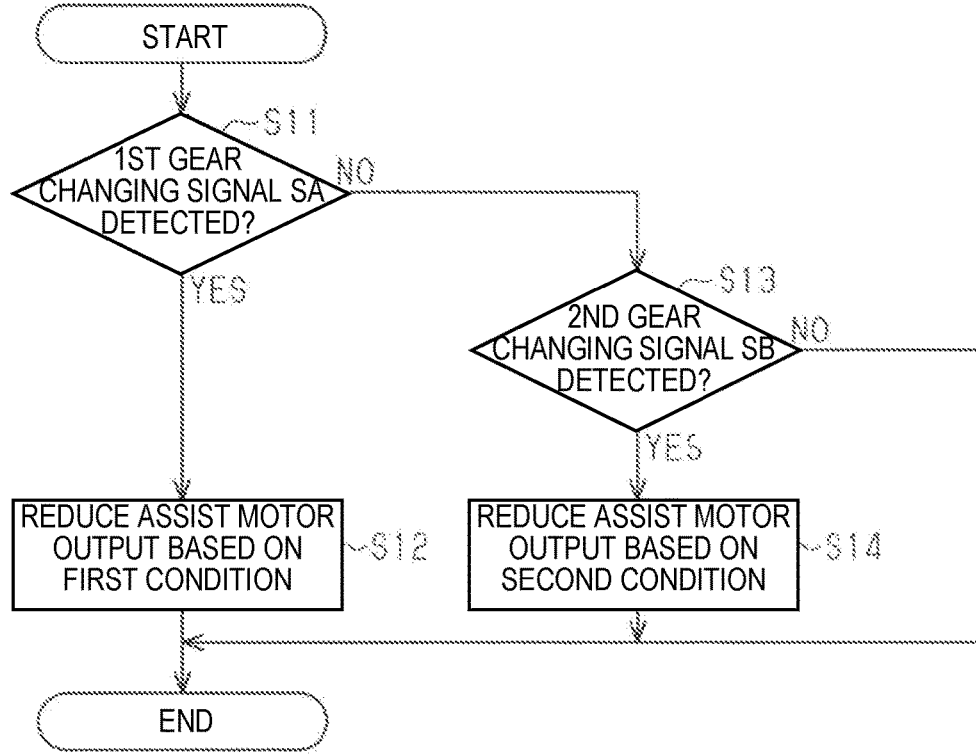
FIG. 9 is a flowchart showing a motor control procedure that is executed by the control apparatus illustrated in FIG. 8 for controlling a motor.

The control apparatus 56 is programmed to carry out the control procedure of FIG. 9 once every prescribed period. The control procedure of FIG. 9 is prestored in a memory device of the control apparatus 56.

In step S11, the control apparatus 56 is programmed to determine whether or not a first gear changing signal SA has been detected. Specifically, when the control apparatus 56 determines that the first detection signal of the first state has become equal to or greater than the first threshold value that is set in advance, the operation proceeds to step S12. In step S12, the control apparatus 56 is programmed to reduce the output of the motor 40 based on a first condition.

When a determination is made by the control apparatus 56 in step S11 that a first gear changing signal SA has not been detected, the control apparatus 56 proceeds to step S13. In step S13, the control apparatus 56 is programmed to determine whether or not a second gear changing signal SB has been detected. Specifically, when the control apparatus 56 determines that the second detection signal of the second state has become equal to or greater than the second threshold value that is set in advance, the operation proceeds to step S14. In step S14, the control apparatus 56 is programmed to reduce the output of the motor 40 based on a second condition, which is different from the first condition. The first condition and the second condition include the time needed to decrease the output of the motor 40.

When the output of the motor 40 is reduced based on the first condition and a first prescribed time has elapsed since the output of the motor 40 was reduced, the control apparatus 56 ends the control to reduce the output of the motor 40. The first prescribed time is preferably set to a time that is sufficiently greater than the standard time that is considered necessary for the gear shifting device 26 to upshift.

When the output of the motor 40 is reduced based on the second condition and a second prescribed time has elapsed since the output of the motor 40 was reduced, the control apparatus 56 ends the control to reduce the output of the motor 40. The second prescribed time is preferably set to a time that is sufficiently greater than the standard time that is considered necessary for the gear shifting device 26 to downshift. The second prescribed time can be set to either a time that is different from the first prescribed time or a time that is the same as the first prescribed time.

The bicycle control system 50 performs the following actions and obtains the following effects.

(1) The detection device 54 detects the movements of the first operating member 62 and the second operating member 64 with the single sensor 88. Consequently, reducing the number of sensors, when compared to a configuration in which the movement of the first operating member 62 and the movement of the second operating member are detected using separate sensors, is possible. Additionally, since the number of sensors can be reduced, reducing the weight of the detection device 54 is possible.

(2) The first detection signal of the first state continuously changes according to the first distance between the sensor 88 and the first detector 90. The second detection signal of the second state continuously changes according to the second distance between the sensor 88 and the second detector 92. For this reason, detecting the operation amount of the first operating member 62 and the second operating member 64 is possible.

(3) The control apparatus 56 reduces the output of the motor 40 in response to the first gear changing signal SA and the second gear changing signal SB. Accordingly, reducing the torque that is applied to the gear shifting device 26 during shifting is possible; therefore, the shifting performance is improved.

(4) The control apparatus 56 can reduce the torque that is appropriate for upshifting and for downshifting by differentiating the time to reduce the output of the motor 40 between when receiving the first gear changing signal SA and when receiving the second gear changing signal SB.

(5) The detection device 54 is configured to output the first detection signal of the first state and the second detection signal of the second state to the control apparatus 56 when the operation angles of the levers 78 and 82 are less than a prescribed angle, that is, within a range wherein the winding body 70 will not move even if the operating members 62 and 64 move. That is, the control apparatus 56 is able to detect the gear changing signals SA and SB before the inner cable CA begins to be moved by the winding body 70. For this reason, controlling the output of the motor 40 before the gear shifting device 26 starts the operation to change the gear ratio is possible. For this reason, the shifting performance is further improved.

Second Embodiment

Figure 10:
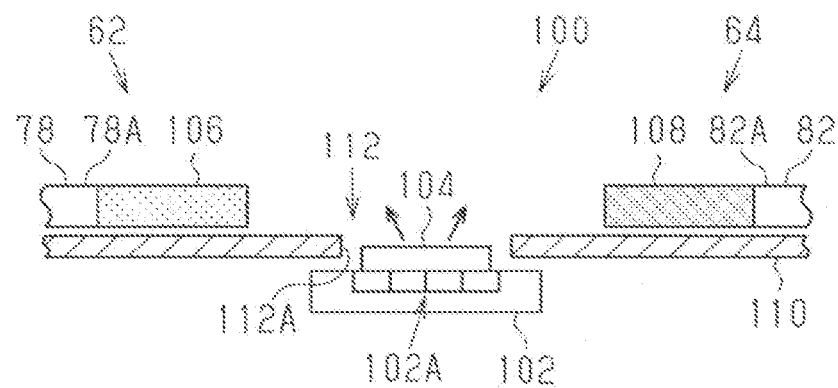
FIG. 10 is a simplified schematic diagram of a portion of an operating device in accordance with a second embodiment with a first operating member and a second operating member of the operating device in reference positions with respect to a bicycle detection device.

As shown in FIG. 10, the bicycle control system of the present embodiment comprises a detection device 100. The detection device 100 comprises a sensor 102, a light emitting part 104, a first detector 106, a second detector 108 and a light shielding sheet 110.

The sensor 102 is a color sensor comprising a plurality of light receiving elements 102A. The light receiving element 102A is, for example, a photodiode or CCD. Each of the light receiving elements 102A is covered by color filters with different colors (not shown in the drawings). Accordingly, the sensor 102 outputs a signal corresponding to the received color.

The first detector 106 and the second detector 108 are different colors from each other. Accordingly, the first detector 106 and the second detector 108 each reflect light corresponding to a different color than the other.

The light emitting part 104 and the sensor 102 are disposed on the opposite side of the first detector 106 and the second detector 108 across the light shielding sheet 110. A guide portion 112 is formed in a portion of the light shielding sheet 110 where the light emitting part 104 and the sensor 102 are disposed. The guide portion 112 includes a window 112A. The window 112A guides light to the sensor 102. The light emitting part 104 can be disposed between the light shielding sheet 110 and the first and second detectors 106 and 108. In short, the light emitting part 104 can be disposed in any position capable of irradiating light on the first and second detectors 106 and 108.

Figure 11:
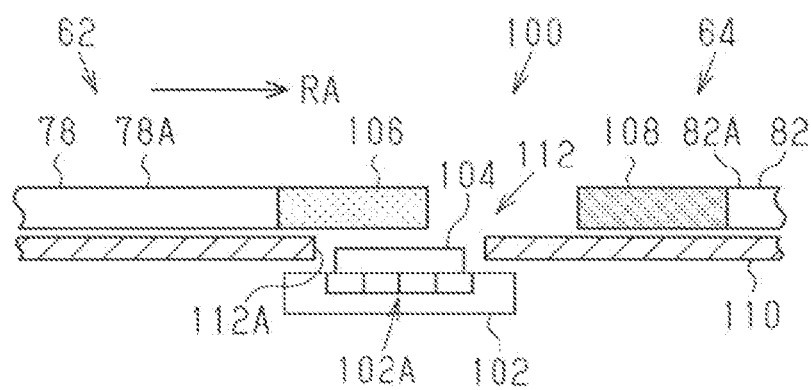
FIG. 11 is a simplified schematic diagram of the portion of the operating device illustrated in FIG. 10 with the first operating member in an operated position and the second operating member in the reference position.

When the lever 78 is operated by the rider, the first detector 106 shown in FIG. 10 moves in the first direction RA, as shown in FIG. 11. When the first detector 106 moves into alignment with the window 112A, the light of the light emitting part 104 is irradiated on the first detector 106. The first detector 106 reflects light corresponding to the color of the first detector 106. Of the light receiving elements 102A, the output voltage of the light receiving element 102A that corresponds to the reflected light is changed. The sensor 102 outputs a detection signal of the first state based on the change in the output voltage of the light receiving element 102A that corresponds to the reflected light.

Figure 12:
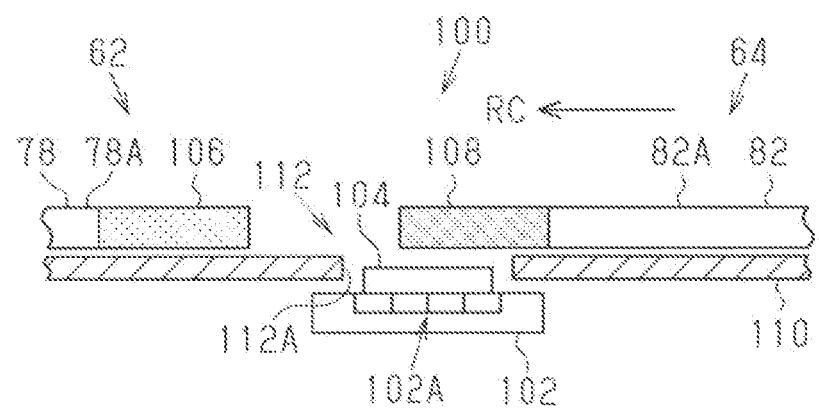
FIG. 12 is a simplified schematic diagram of the portion of the operating device illustrated in FIG. 10 with the first operating member in the reference position and the second operating member in an operated position.

When the lever 82 is operated by the rider, the second detector 108 shown in FIG. 10 moves in the third direction RC, as shown in FIG. 12. When the second detector 108 moves into alignment with the window 112A, the light of the light emitting part 104 is irradiated on the second detector 108. The second detector 108 reflects light corresponding to the color of the second detector 108. Of the light receiving elements 102A, the output voltage of the light receiving element 102A that corresponds to the reflected light is changed. The sensor 102 outputs a detection signal of the second state based on the change in the output voltage of the light receiving element 102A that corresponds to the reflected light.

The detection device 100 is configured to detect the movements of the first operating member 62 and the second operating member 64 with the single sensor 102. Accordingly, reducing the number of sensors in the detection device 100 is possible.

Third Embodiment

Figure 13:
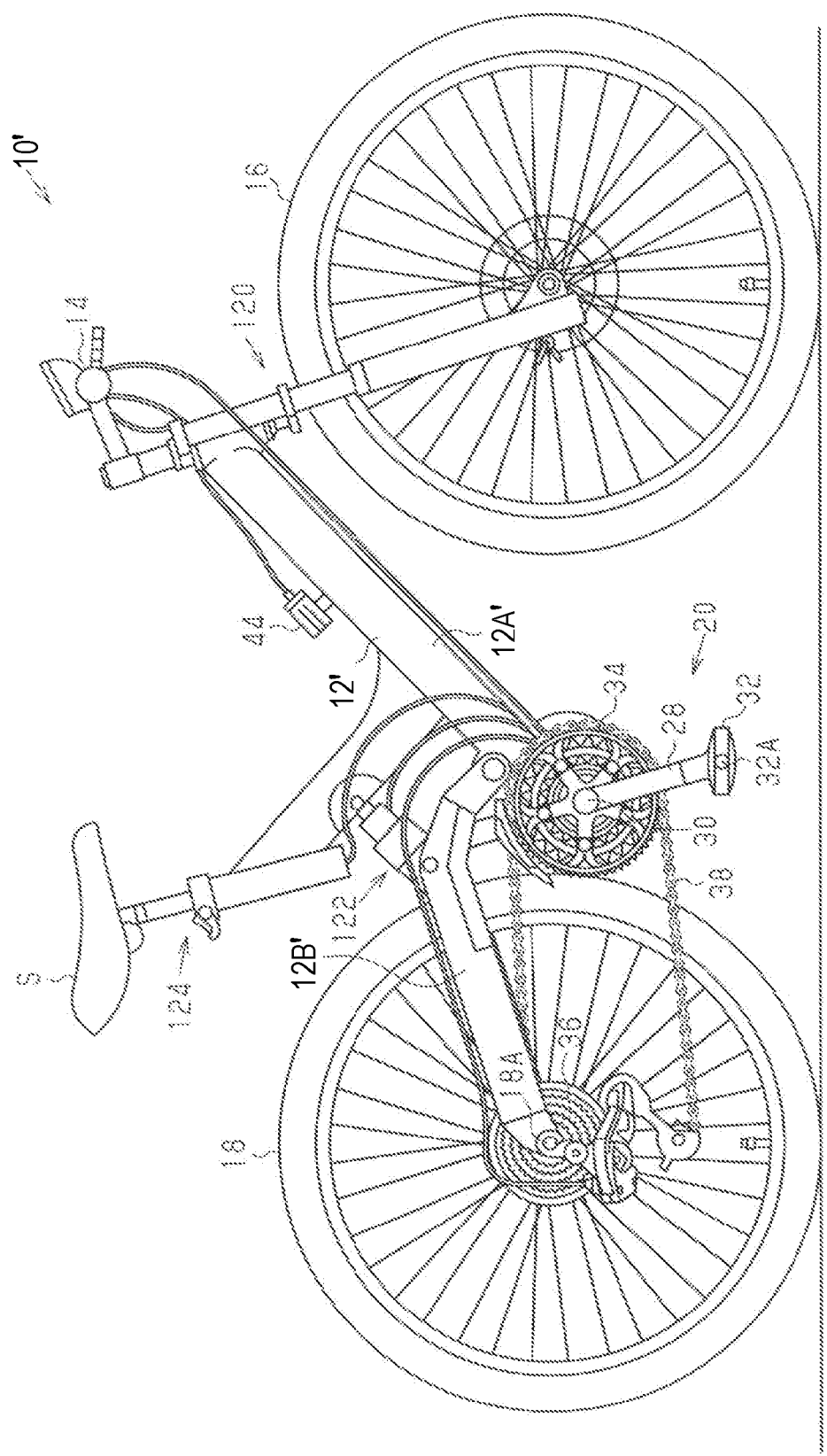
FIG. 13 is a side elevational view of a bicycle equipped with a bicycle control system in accordance with a third embodiment.

As shown in FIG. 13, a bicycle 10' is equipped with a bicycle control system 150 in accordance with a third embodiment. Here, the bicycle 10' has a frame 12' comprises a main frame 12A and a swing arm 12B'. The swing arm 12B' is pivotally coupled to the rear end of the main frame 12A'. For the sake of simplicity, the parts of the bicycle 10' that are the same as the parts of the bicycle 10 will be given the same reference numeral. Thus, the bicycle 10' includes the front wheel 16 and the rear wheel 18. The bicycle control system of the third embodiment comprises an electric front suspension 120 and an electric rear suspension 122. The electric front suspension 120 is a bicycle component and more particularly a bicycle electric component. The electric rear suspension 122 is a bicycle component and more particularly a bicycle electric component. The front suspension 120 connects the front end of the main frame 12A' and the front wheel 16. The rear suspension 122 is coupled to the rear end of the main frame 12A' and the swing arm 12B'. The rear wheel 18 is rotatably attached to the swing arm 12B'.

Figure 14:
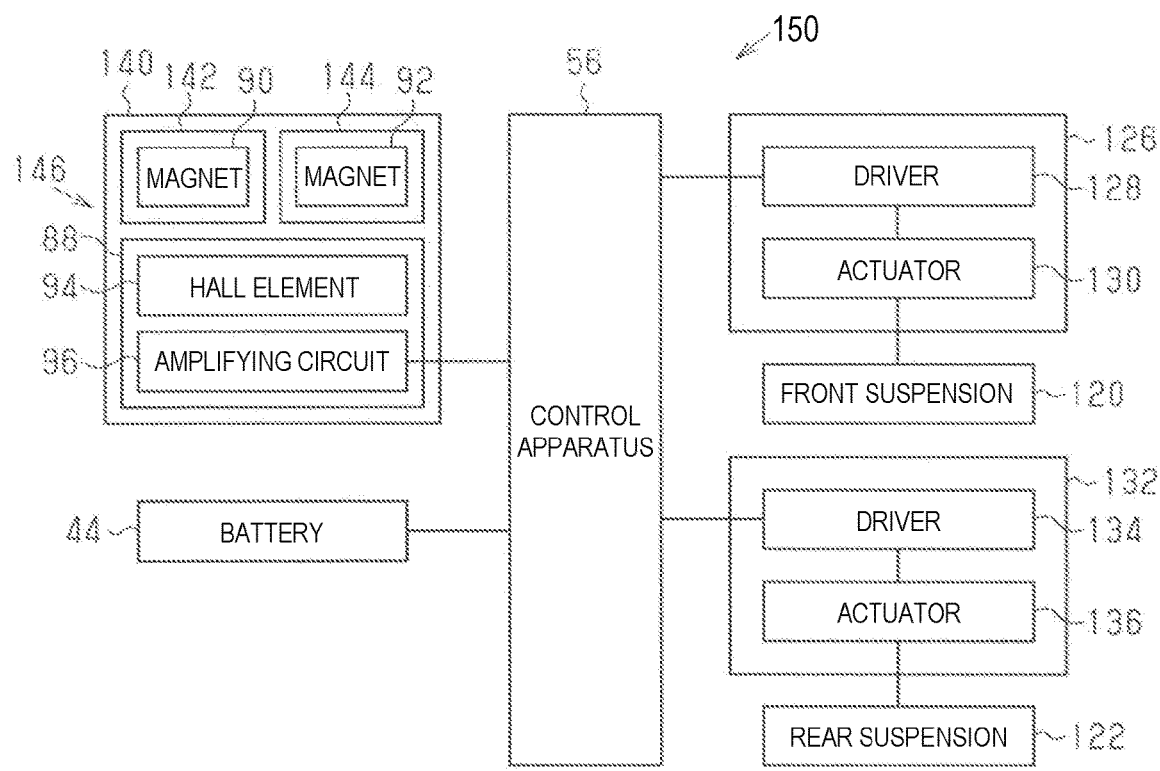
FIG. 14 is a simplified block diagram of the bicycle control system illustrated in FIG. 13.

As shown in FIG. 14, an adjustment device 126 is coupled to the front suspension 120. The adjustment device 126 comprises a driver 128 and an actuator 130. An adjustment device 132 is coupled to the rear suspension 122. The adjustment device 132 comprises a driver 134 and an actuator 136.

The operating device 140 comprises a first operating member 142, a second operating member 144 and a detection device 146. The first operating member 142 is configured in the same way as the first operating member 62 of the first embodiment. The first operating member 142 is configured to be operated from a reference position and to return to the reference position when the hand is released. The second operating member 144 is configured in the same way as the second operating member 64 of the first embodiment. The second operating member 144 is configured to be operated from a reference position and to return to the reference position when the hand is released. The detection device 146 includes the sensor 88, the first detector 90 and the second detector 92. The configuration of the sensor 88 is the same as that in the first embodiment, and the description thereof has been omitted. The first detector 90 is provided on the first operating member 142 in the same way the first detector 90 is provided on the first operating member 62 of the first embodiment. The second detector 92 is provided on the second operating member 144 in the same way the second detector 92 is provided on the second operating member 64 of the first embodiment.

The control apparatus 56 drives the actuators 130 and 136 via the drivers 128 and 134, based on a first detection signal of the first state that is output by operating the first operating member 142. At least either the damping, rebound, hardness, or height of the suspensions 120 and 122 is adjusted continuously or in a stepwise manner, according to the operation amount of the first operating member 142 via the driving of the actuators 130 and 136. Here, for example, the damping is increased, the rebound is increased, the hardness is increased, or the height is increased, according to the operation amount of the first operating member 142. The control apparatus 56 maintains the damping, rebound, hardness, and height, which are adjusted corresponding to the position at which the operation amount of the first operating member 142 became the greatest, until the second operating member 144 is operated.

The control apparatus 56 drives the actuator 130 based on a second detection signal of the second state that is output by operating the second operating member 144. At least either the damping, rebound, hardness, or height of the suspensions 120 and 122 is adjusted according to the operation amount of the second operating member 144 via the driving of the actuators 130 and 136. The control apparatus 56 is programmed to adjust at least one of the damping, the rebound, the hardness, and the height of the suspensions 120 and 122, either continuously or in a stepwise manner in a different direction depending on whether the first operating member 142 is operated or the second operating member 144 is operated. Here, for example, the damping is decreased, the rebound is decreased, the hardness is decreased, and/or the height is decreased, according to the operation amount of the second operating member 144. The control apparatus 56 is programmed to maintain the damping, the rebound, the hardness, and the height, which are adjusted corresponding to the position at which the operation amount of the second operating member 144 became the greatest, until the first operating member 142 is operated. Which of the damping, the rebound, the hardness, or the height parameters is changed and how that parameter should be changed when the first operating member 142 and the second operating member 144 are operated can be set in the control apparatus 56 in advance. Alternately, this can be set in the control apparatus 56 by the user by using at least one of a cycle computer and an external device, such as a personal computer, a smartphone, etc.

Fourth Embodiment

Figure 15:
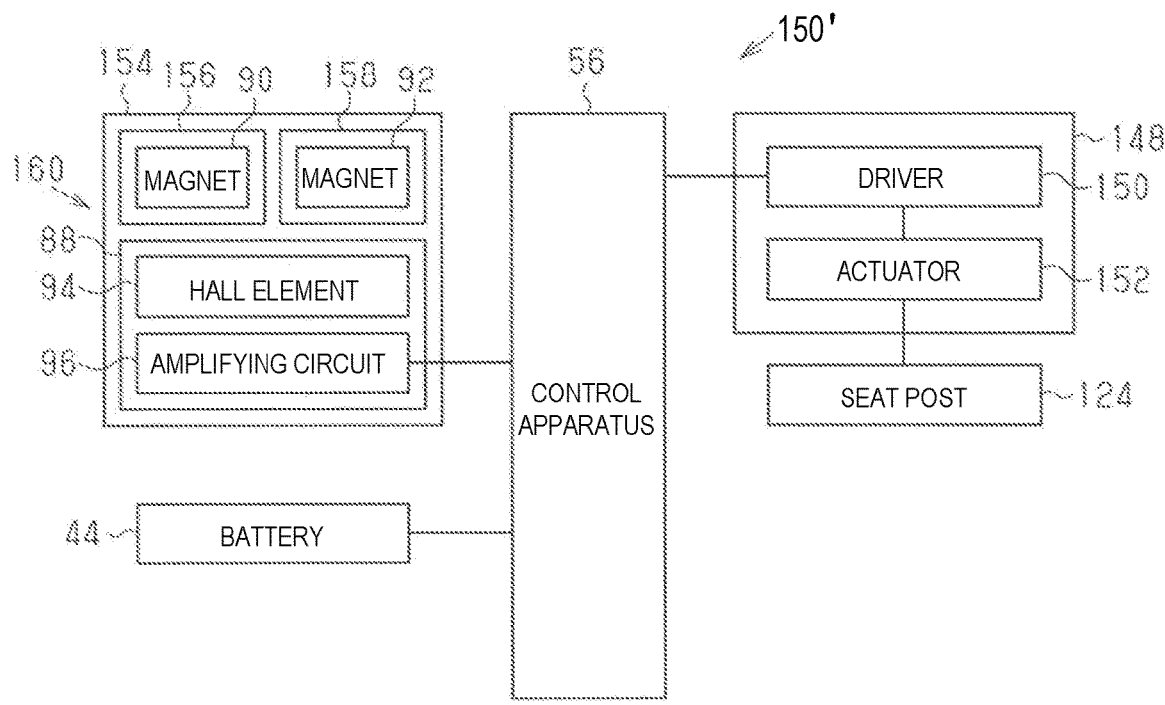
FIG. 15 is a simplified block diagram of a bicycle control system in accordance with a fourth embodiment.

As shown in FIG. 15, a bicycle control system 150' is illustrated in accordance with a fourth present embodiment. The bicycle control system 150' is mounted to the bicycle 10'. The bicycle 10' comprises an electric seatpost 124, which is a bicycle component and more particularly a bicycle electric component. The seatpost 124 adjusts the height of a saddle S (see FIG. 13). An adjustment device 148 is coupled to the seatpost 124. The adjustment device 148 comprises a driver 150 and an actuator 152.

The operating device 154 comprises a first operating member 156, a second operating member 158 and a detection device 160.

The first operating member 156 is configured in the same way as the first operating member 62 of the first embodiment. The first operating member 156 is configured to be operated from a reference position and to return to the reference position when the hand is released. The second operating member 158 is configured in the same way as the second operating member 64 of the first embodiment. The second operating member 158 is configured to be operated from a reference position and to return to the reference position when the hand is released. The detection device 160 includes the sensor 88, the first detector 90 and the second detector 92. The configuration of the sensor 88 is the same as that in the first embodiment, and the description thereof has been omitted. The first detector 90 is provided on the first operating member 142 in the same way the first detector 90 is provided on the first operating member 62 of the first embodiment. The second detector 92 is provided on the second operating member 144 in the same way the second detector 92 is provided on the second operating member 64 of the first embodiment.

The control apparatus 56 drives the actuator 152 via the driver 150, based on a first detection signal of the first state that is output by operating the first operating member 156. The seatpost 124 is extended or contracted continuously or in a stepwise manner according to the operation amount of the first operating member 156 via the driving of the actuator 152.

The control apparatus 56 drives the actuator 152 based on a magnitude of the second detection signal of the second state that is output by operating the second operating member 158. The seatpost 124 is extended or contracted according to the operation amount of the second operating member 158 via the driving of the actuator 152. The control apparatus 56 adjusts the seatpost 124 in a different direction, depending on whether the first operating member 156 is operated or the second operating member 158 is operated. The behavior of the seatpost 124 when the first operating member 156 and the second operating member 158 are operated can be set in the control apparatus 56 in advance or can be set in the control apparatus 56 by the user by using at least either an external device, such as a personal computer or a smartphone, or a cycle computer.

Modified Example of First to Fourth Embodiments

The specific forms that the bicycle control system, etc. can take are not limited to the forms described in the first to the fourth embodiments. The bicycle control system, etc. can take various forms that are different from those explained in the first to the fourth embodiments. The modified example of the first to the fourth embodiments described below is one example of the various forms that the bicycle control system, etc. can take.

Figure 16:
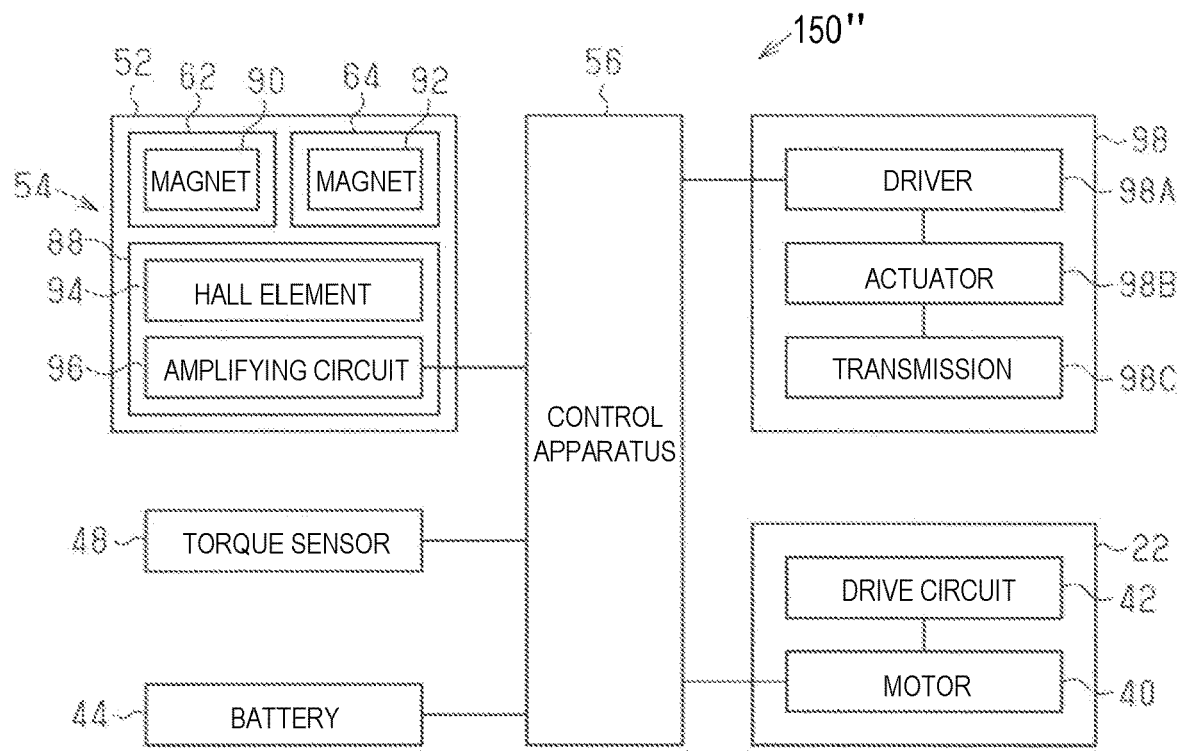
FIG. 16 is a simplified block diagram of a bicycle control system according to a modification of the first embodiment.

As shown in FIG. 16, a control system 150" is illustrated in which the gear shifting device 26 of the first embodiment is replaced with an electric gear shifting device 98, as shown in FIG. 16. The gear shifting device 98 comprises a driver 98A, an actuator 98B and a transmission 98C. The transmission 98C is configured in the same way as the gear shifting device 26 of the first embodiment, and the actuator 98B is coupled to the portion that is operated by the inner cable CA. The control apparatus 56 drives the actuator 98B via the driver 98A, based on a first detection signal of a first state and a second detection signal of a second state. The shift position of the transmission 98C is thereby changed.

The sensor 88 of the first embodiment can be changed to a sensor in which the output voltage V changes in a stepwise manner according to the distance from the detectors 90 and 92 when the distance from the detectors 90 and 92 is less than a prescribed distance.

The sensor 88 of the first embodiment can be changed to a sensor in which the output voltage V becomes a prescribed output voltage V when the distances from the detectors 90 and 92 is less than a prescribed distance. In this case, the magnetic pole of the first detector 90 that is on the side closer to the sensor 88 and the magnetic pole of the second detector 92 on the side closer to the sensor 88 are reversed. The increase/decrease of the output voltage V with respect to a reference voltage VA is reversed, depending on whether the distance between the sensor 88 and the first detector 90 becomes less than a prescribed distance or the distance between the sensor 88 and the second detector 92 becomes less than a prescribed distance. As a result, detecting the movements of the two operating members 62 and 64 with the single sensor 88 becomes possible.

In the modified example described above, the magnetic pole of the first detector 90 that is on the side closer to the sensor 88 and the magnetic pole of the second detector 92 on the side closer to the sensor 88 can also match. In this case, for example, the first detector 90 is comprised of one magnet and the second detector 92 is comprised of two magnets. A detection signal in which a prescribed output voltage V has been reached within a prescribed period once becomes the detection signal of the first state, and a detection signal in which the prescribed output voltage V has been reached twice within a prescribed period becomes the detection signal of the second state.

In the first condition and the second condition of the first embodiment, the control apparatus 56 can also differentiate the reduction amount of the output of the motor 40, depending on whether the first gear changing signal SA is detected or the second gear changing signal SB is detected.

In the first embodiment, the control apparatus 56 can make the time to reduce the output of the motor 40 the same, regardless of whether the first gear changing signal SA is detected or the second gear changing signal SB is detected.

Figure 17:
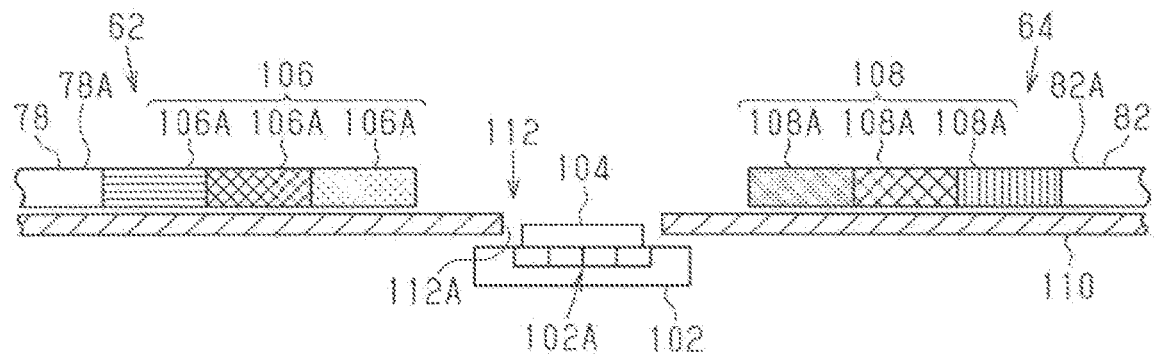
FIG. 17 is a simplified schematic diagram of a portion of an operating device in accordance with a first modification of the second embodiment with the first operating member and the second operating member in reference positions with respect to a bicycle detection device.

Additionally, as shown in FIG. 17, the first detector 106 and the second detector 108 in the detection device 100 of the second embodiment can be changed. The first detector 106 comprises a plurality of first color portions 106A that are different colors from each other. The second detector 108 comprises a plurality of second color portions 108A that are different colors from each other. The colors of the first color portions 106A are different from the second color portions 108A. The first color portions 106A are arranged in a direction in which the first operating member 62 and the first detector 106 are moved. The second color portions 108A are arranged in a direction in which the second operating member 64 and the second detector 108 are moved. In this modified example, the sensor 102 outputs a detection signal according to the detected color. As a result, the control apparatus 56 is able to conduct a control corresponding to the operation amount of the operating members 62 and 64.

In the modified example shown in FIG. 17, the first color portions 106A and the second color portions 108A are each configured to emit light. In this case, the first color portions 106A and the second color portions 108A are formed of, for example, LEDs.

In the modified example shown in FIG. 17, the colors of the first color portions 106A and the second color portions 108A can be arranged so that the order of the colors detected by the sensor 102, when the first operating member 62 and the second operating member 64 are operated from a state of not being operated, is different. In this case, matching at least either the colors of the first color portions 106A or the second color portions 108A is possible. The control apparatus 56 is able to determine whether the first operating member 62 or the second operating member 64 has been operated, as well as the operation amount of the operating members 62 and 64, by knowing the order of the detected signals, that is, the order of the colors.

Figure 18:
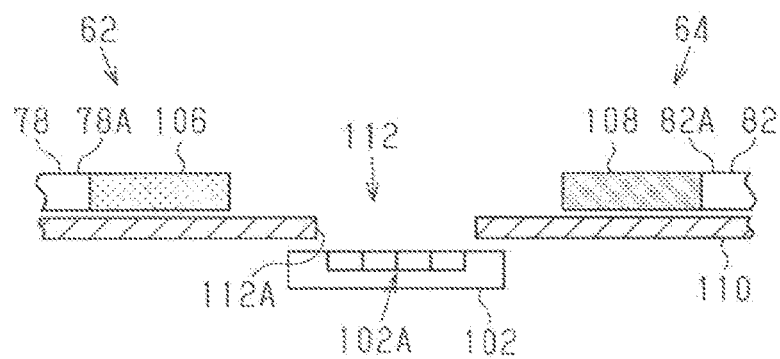
FIG. 18 is a simplified schematic diagram of a portion of an operating device in accordance with a second modification of the second embodiment with the first operating member and the second operating member in reference positions with respect to a bicycle detection device.

As shown in FIG. 18 also, it is possible to change the first detector 106 and the second detector 108 in the detection device 100 of the second embodiment to detectors that are different colors from each other by emitting light. In this case, the first detector 106 and the second detector 108 are formed of, for example, LEDs. In this case, the light emitting part 104 can be omitted as well.

Figure 19:
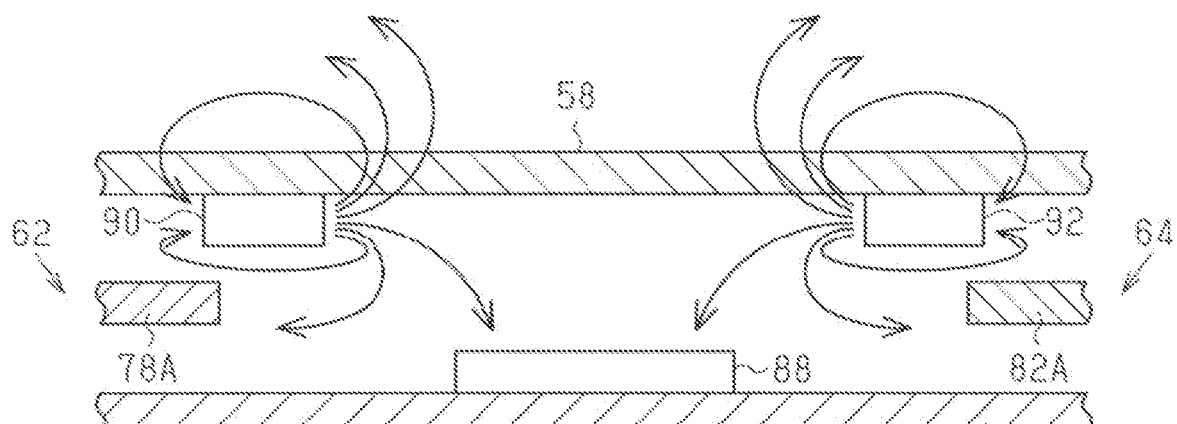
FIG. 19 is a simplified schematic diagram of a portion of an operating device in accordance with a modification of the embodiments with the first operating member and the second operating member of in reference positions with respect to a bicycle detection device.

Also, as shown in FIG. 19, it is possible to configure the first operating member 62, 142, and 156 in each of the embodiments to be movable between the first detectors 90 and 106 and the sensor 88, and to configure the second operating members 64, 144, and 158 to be movable between the second detectors 92 and 108 and the sensor 88. In this case, for example, the first detector 90 and the second detector 92 are fixed in positions that are less than a prescribed distance from the sensor 88. The proximal end portion 78A of the lever 78 is formed of a magnetic material. The edge of the proximal end portion 78A can be moved between the first detector 90 and the sensor 88. The proximal end portion 82A of the lever 82 is formed of a magnetic material. The edge of the proximal end portion 82A can be moved between the second detector 92 and the sensor 88. When the lever 78 and the lever 82 are in the reference positions, the magnetic flux of the first detector 90 and the second detector 92 reaches the sensor 88.

Figure 20:
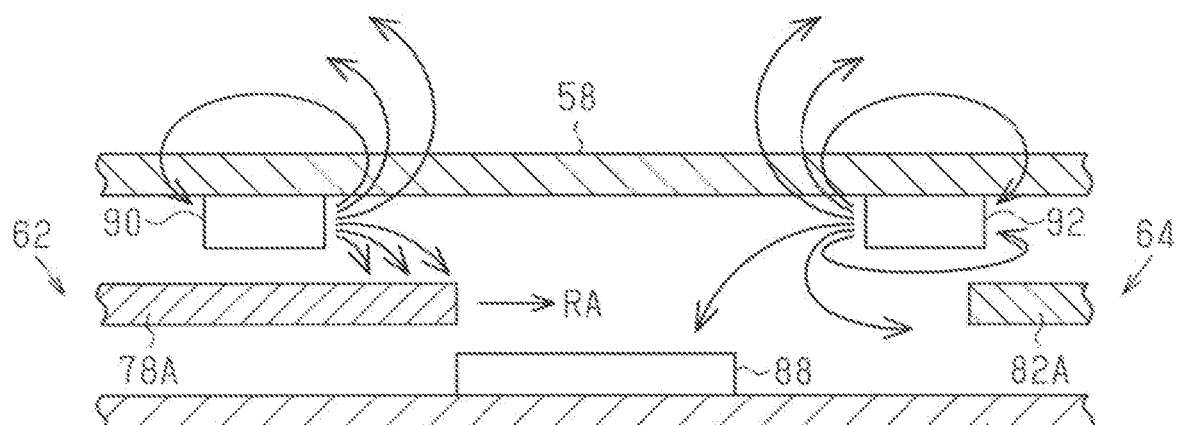
FIG. 20 is a simplified schematic diagram of the portion of the operating device illustrated in FIG. 19 with the first operating member in an operated position and the second operating member in the reference position.

As shown in FIG. 20, when the proximal end portion 78A reaches a position opposing the first detector 90 via an operation of the first operating member 62, the magnetic flux of the first detector 90 is blocked by the proximal end portion 78A and will not reach the sensor 88. Consequently, a detection signal of the first state in which the output voltage V of the sensor 88 has been decreased is output.

Figure 21:
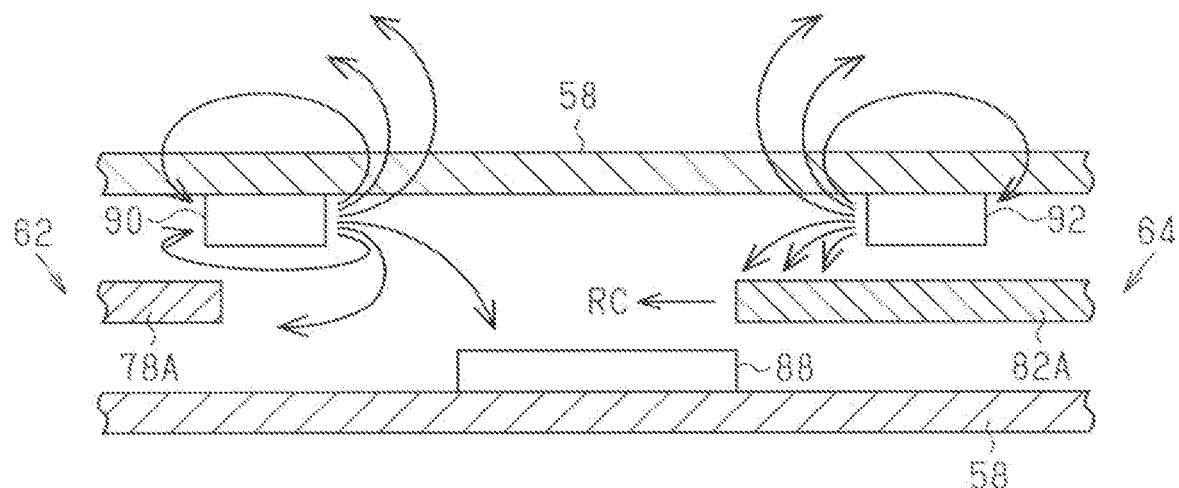
FIG. 21 is a simplified schematic diagram of the portion of the operating device illustrated in FIGS. 19 and 20 with the first operating member in the reference position and the second operating member in an operated position.

As shown in FIG. 21, when the proximal end portion 82A reaches a position opposing the second detector 92 via an operation of the second operating member 64, the magnetic flux of the second detector 92 is blocked by the proximal end portion 82A and will not reach the sensor 88. Consequently, a second detection signal of the second state in which the output voltage V of the sensor 88 has been increased is output.

In the modified example shown in FIGS. 19 to 21, it is also possible to provide holes to the proximal end portions 78A and 82A. In this case, the proximal end portions 78A and 82A, the first detector 90, the second detector 92, and the sensor 88 are disposed so that, when the holes of the proximal end portions 78A and 82A reach positions corresponding to the first detector 90 and the second detector 92, the magnetic flux of the first detector 90 and the second detector 92 will reach the sensor 88. Accordingly, a detection signal of the first state is output when the hole of the proximal end portion 78A reaches a position corresponding to the first detector 90, and a detection signal of the second state is output when the hole of the proximal end portion 82A reaches a position corresponding to the second detector 92.

Fifth Embodiment

Figure 22:
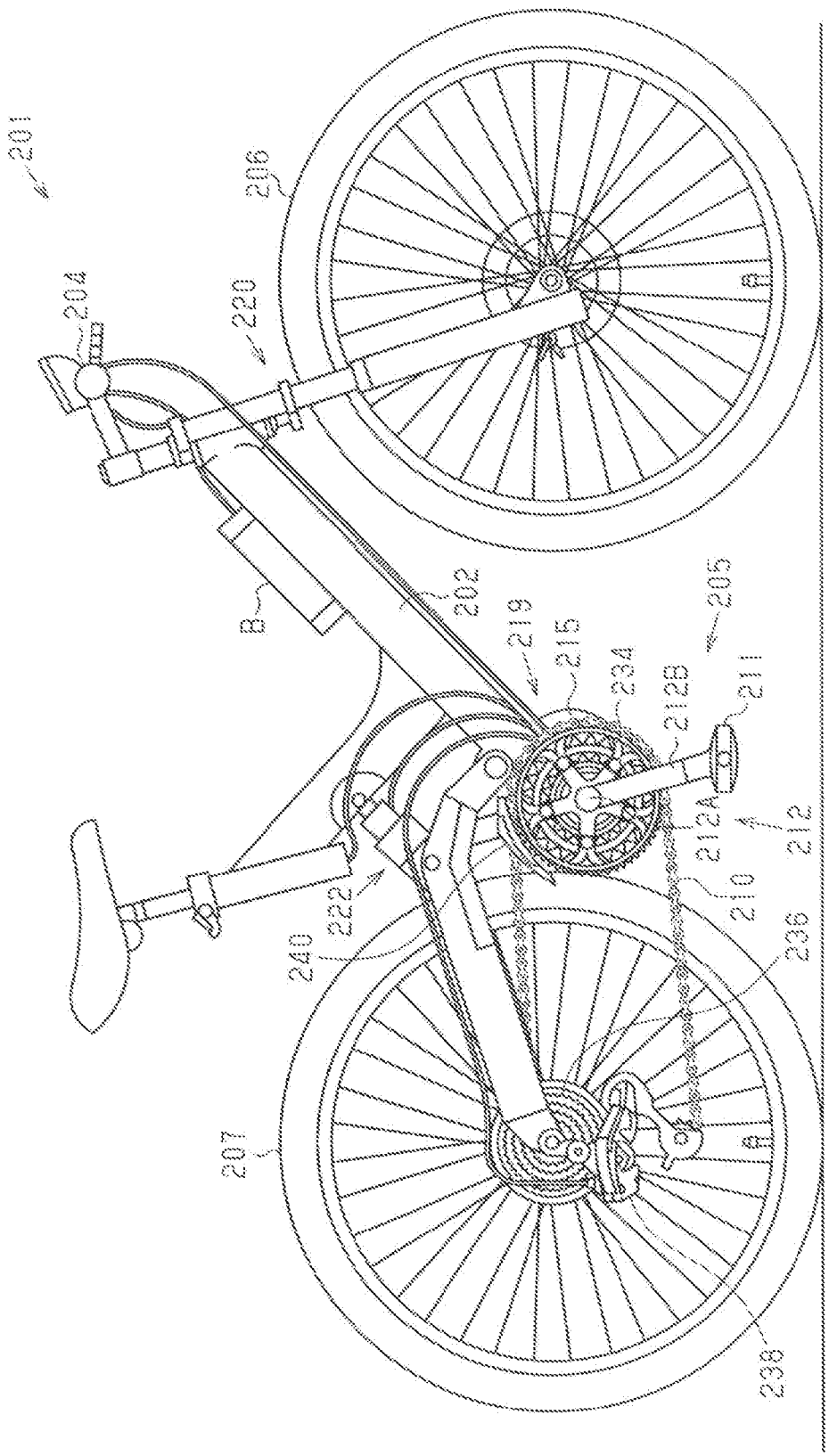
FIG. 22 is a side elevational view of a bicycle equipped with a bicycle control apparatus in accordance with a fifth embodiment.

Referring now to FIG. 22, a side elevational view of a bicycle 201 is illustrated which is equipped with a bicycle control apparatus 1 in accordance with a fifth embodiment. As shown in FIG. 22, the bicycle 201 comprises a frame 202, a handlebar 204, a drive unit 205, a front wheel 206 and a rear wheel 207. In the fifth embodiment, the bicycle 201 is a mountain bike comprising a front suspension 220 and a rear suspension 222 on the frame 202. However, the bicycle control apparatus 1 can also be used with a bicycle that does not have a front and/or rear suspension.

The drive unit 205 comprises a chain 210, a pair of pedals 211, a crank 212, an assist mechanism 215 and a detachable rechargeable battery B. Each of these is supported by the frame 202. The pedals 211 are attached to the crank 212. The detachable rechargeable battery B serves as a power source for the assist mechanism 215. The crank 212 comprises a crank axle 212A and a pair of crank arms 212B. Each crank arm 212B is provided to the two ends of the crank axle 212A. The drive unit 205 further comprises a plurality of front sprockets 234. The front sprockets 234 are directly or indirectly connected to the crank 212. The rear wheel 207 includes a plurality of rear sprockets 236. The chain 210 is wrapped around between one of the front sprockets 234 and one of the rear sprockets 236 to transmit the drive force. The rechargeable battery B is detachably mounted to the frame 202. The rechargeable battery B is a storage battery that includes, for example, a nickel hydride cell or a lithium ion cell.

The drive unit 205 comprises a front transmission mechanism 238 and a rear transmission mechanism 240. The front transmission mechanism 238 switches the chain 210 among the front sprockets 234. The rear transmission mechanism 240 switches the chain 210 among the rear sprockets 236. The front transmission mechanism 238 and the rear transmission mechanism 240 are each controlled by a gear changing control apparatus (not shown in the drawings) that is provided to the handlebar 204. The front sprocket 234 can be configured by one of these, in which case the front transmission mechanism 238 is omitted.

Figure 23:
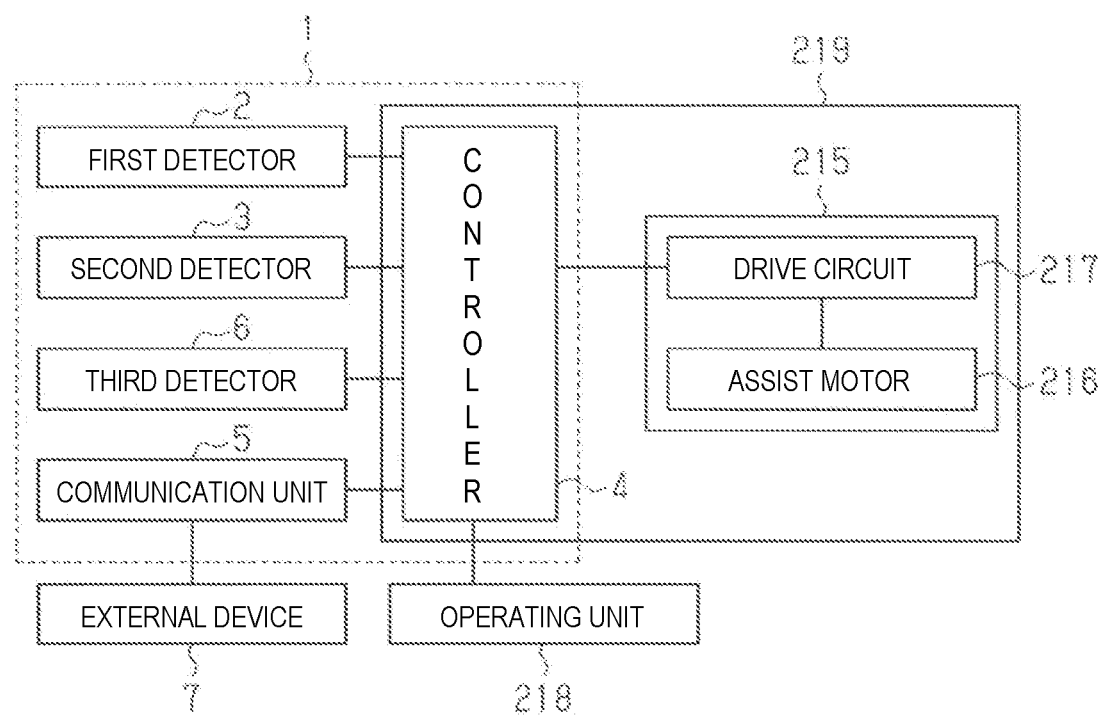
FIG. 23 is a simplified block diagram showing the configuration of the bicycle control apparatus illustrated in FIG. 22 in accordance with the fifth embodiment.

FIG. 23 is a block diagram that depicts the bicycle control apparatus 1. As shown in FIG. 23, the bicycle control apparatus 1 comprises a first detector 2, a second detector 3, a controller 4, a communication unit 5, and a third detector 6. An operating unit 218 and an assist mechanism 215 are connected to this bicycle control apparatus 1. The first detector 2, the second detector 3, the communication unit 5, and the third detector 6 are electrically connected to the controller 4.

The operating unit 218 is mounted to the handlebar 204 (see FIG. 22). The operating unit 218 is provided to the bicycle 201, as shown in FIG. 22. The operating unit 218 shown in FIG. 23 is electrically connected by wire or is wirelessly connected to the controller 4 of the bicycle control apparatus 1. With the operation of this operating section 218, an assist condition is selected by the assist mechanism 215. The operating unit 218 comprises, for example, an operating switch. For instance, by operating the operating unit 218, one assist condition can be selected from among a first assist condition, a second assist condition, and a third assist condition. Changing the size of the running assist force PX with respect to manual drive force is possible by changing a plurality of assist conditions. Meanwhile, the details of each assist condition will be described later.

The assist mechanism 215 comprises an assist motor 216 and a drive circuit 217. The assist motor 216 is controlled by a drive circuit 217. Additionally, the drive circuit 217 controls the assist motor 216 based on a command from the controller 4. The assist motor 216 is coupled to a power transmission path comprising a crankshaft 212A that is provided between the crank arms 212B and the front sprocket 234, as shown in FIG. 22. The assist mechanism 215 can be configured to comprise a reduction gear, which is not shown, and to transmit the output of the assist motor 216 to the power transmission path via the reduction gear. As shown in FIG. 23, the drive unit 219 is configured to comprise the controller 4 of the bicycle control apparatus 1 and the assist mechanism 215. The drive unit 219 is detachably provided to the frame 202 (see FIG. 22).

The first detector 2 shown in FIG. 23 detects a manual drive force. Specifically, the first detector 2 outputs a signal corresponding to the manual drive force. For example, the first detector 2 is a torque sensor, which outputs a signal (for example, voltage) corresponding to the torque acting on a power transmission path comprising a crankshaft 212A of a crank 212, as shown in FIG. 22, or a crankshaft 212A that is provided between a crank arm 212B and the front sprocket 234. For example, the torque sensor can be a magnetostrictive sensor or a strain gauge. The first detector 2 shown in FIG. 23 sends information regarding the detected manual drive force to the controller 4.

The second detector 3 detects the rotational state of the crank 212. The rotational state of the crank 212 includes the rotational angle TA of the crank 212. Here, the rotational angle TA of the crank 212 refers to the rotational angle at which the reference is the position of the crank 112 at a point in time when the assist motor 216 has started running the assist (see FIG. 23). The rotational angle TA can be rephrased as the total amount of rotation of the crank 212 from the point in time that running assist has started. The second detector 3 can detect the rotational angle of the crankshaft 212A or the rotational angle of the crank arm 212B as the rotational angle TA of the crank 212. The second detector 3 shown in FIG. 23 sends information regarding the detected rotational angle TA to the controller 4.

Additionally, the rotational state of the crank 212 includes the rotational speed KA of the crank 212. The second detector 3 shown in FIG. 23 functions as a cadence sensor and detects the cadence of the crank 212 (see FIG. 22) as the rotational speed KA. The second detector 3 can also detect the rotation period of the crank 212 (see FIG. 22) as the rotational state. The second detector 3 sends information regarding the detected cadence to the controller 4.

For example, the second detector 3 includes a rotary encoder and detects the rotational angle TA of the crankshaft 212A (see FIG. 22) by detecting a change in the magnetic flux density of a multipolar magnet attached to the crankshaft 212A (see FIG. 22) by using a Hall element. The second detector 3 can detect the rotational speed KA of the crankshaft 212A (see FIG. 23) based on the rotational angle TA of the crankshaft 212A (see FIG. 22) and the time. The second detector 3 can be formed of a magnet that is provided to the crankshaft 212A (see FIG. 22) or the crank arm 212B (see FIG. 22). A reed switch is provided that detects this magnet, detects the rotational speed KA of the crankshaft 212A (see FIG. 22). The second detector 3 can be an optical encoder, instead of a magnetic encoder, and can be made a rotational angle sensor other than a rotary encoder.

The third detector 6 detects a traveling speed of the bicycle 201. The third detector 6, for example, includes a reed switch that detects a magnet that is provided to the rear wheel 207 (see FIG. 22). The controller 4 calculates the traveling speed ZA of the bicycle 201 based on the detected value of the third detector 6 and the tire diameter.

The controller 4 causes the assist motor 216 to execute the running of the assist when a prescribed condition has been met. For example, the controller 4 causes the assist motor 216 to execute the running of the assist when a determination is made that the manual drive force (the torque) that is detected by the first detector 2 is equal to or greater than a manual drive force reference value, which is set in advance. The controller 4 reduces or stops the output of the assist motor 216 when the traveling speed ZA detected by the third detector 6 becomes equal to or greater than a prescribed speed. The prescribed speed corresponds to, for example, 25 km per hour.

The controller 4 controls the running assist force PX to be output by the assist motor 216 according to the manual drive force detected by the first detector 2, the rotational angle TA, which is the detection result detected by the second detector 3, and the traveling speed ZA, which is the detection result detected by the third detector 6. Specifically, the controller 4 causes the assist motor 216 to output a running assist force PX that is less than or equal to a base running assist force that is set according to the manual drive force. The controller 4 comprises, for example, a microcomputer and comprises a CPU (Central processing unit), RAM (random access memory), ROM (read only memory), I/O interface, and the like. Thus, the controller 4 includes at least one processor and at least one memory device with the control programs stored therein.

Next, the base running assist force PA, which is set according to the manual drive force, will be explained.

For example, if the first assisting condition is selected by the operating unit 218, the controller 4 sets a running assist force PX that is X times the manual drive force as the base running assist force PA. In the first assisting condition, the controller 4 controls the assist mechanism 215 so that a torque that is X times the torque that acts on the power transmission path from the manual drive force is supplied from the assist mechanism 215 to the power transmission path.

For example, if the second assisting condition is selected by the operating unit 218, the controller 4 sets a running assist force PX that is Y times the manual drive force as the base running assist force PA. In the second assisting condition, the controller 4 controls the assist mechanism 215 so that a torque that is Y times the torque that acts on the power transmission path from the manual drive force is supplied from the assist mechanism 215 to the power transmission path.

For example, if the third assisting condition is selected by the operating unit 218, the controller 4 sets a running assist force PX that is Z times the manual drive force as the base running assist force PA. In the third assisting condition, the controller 4 controls the assist mechanism 215 so that a torque that is Z times the torque that acts on the power transmission path from the manual drive force is supplied from the assist mechanism 215 to the power transmission path. Numbers for X, Y, and Z are selected so that X>Y>Z. For example, X=2, Y=1.5, and Z=1 are selected. Meanwhile, an OFF mode where assisting is not done by the assist mechanism 215 can also be selected by the control section 218.

Next, a method in which the controller 4 is programmed to set the running assist force PX that is less than or equal to the base running assist force PA described above will be explained. When the bicycle crank 212 is rotated from a stopped state, the controller 4 corrects the base running assist force PA described above, according to a rotational angle TA detected by the second detector 3. This corrected base running assist force PA is the running assist force PX that the assist motor 216 is made to output. The controller 4 controls the drive circuit 217 and causes the assist motor 216 to output this running assist force PX.

When the crank 212 is rotated from a stopped state, the controller 4 corrects the base running assist force PA so that the running assist force PX becomes closer to the base running assist force PA as the rotational angle TA increases. More specifically, when the crank 212 is rotated from a stopped state, the controller 4 corrects the base running assist force PA based on correction information corresponding to the rotational angle TA. This correction information is represented by a correction coefficient that increases as the rotational angle TA increases. The controller 4 calculates the running assist force PX by multiplying this correction coefficient by the base running assist force.

Figure 24:
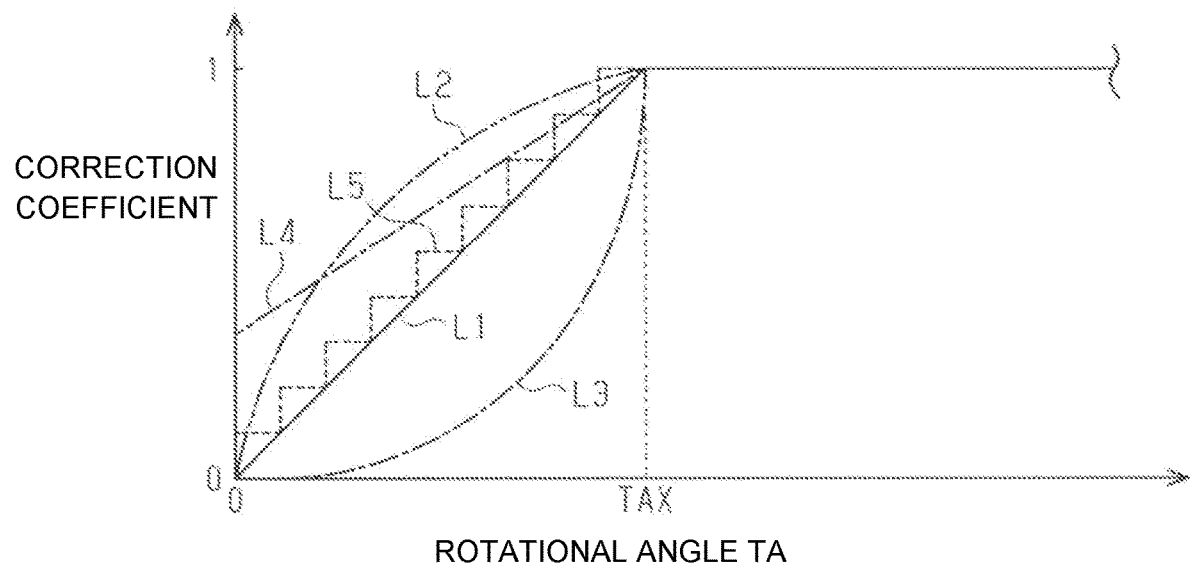
FIG. 24 is a correction coefficient map showing an association between a correction coefficient and a rotational angle.

For example, the controller 4 stores a correction information map, such as that shown in FIG. 24, and sets the correction coefficient based on this correction information map. Meanwhile, the correction information map includes information that correlates the rotational angle TA and the correction coefficient, and the correction coefficient increases as the rotational angle TA increases. While not particularly limited, the correction coefficient is equal to or greater than 0 and less than or equal to 1.

The controller 4 sets the correction coefficient to 1 when the rotational angle TA that is detected by the second detector 3 becomes equal to or greater than a prescribed threshold value TAX. The controller 4 carries out an operation to correct the running assist force PX when the manual drive force is reduced, as described below (hereinafter referred to as the second correction operation), after carrying out an operation to correct the running assist force PX based on the rotational angle TA of the crank 212 (hereinafter referred to as the first correction operation). For example, the threshold value TAX is preferably equal to or greater than 0 degrees and less than or equal to 1000 degrees; more preferably, this is equal to or greater than 20 degrees and less than or equal to 800 degrees. The controller 4 can also calculate a correction coefficient corresponding to the rotational angle TA with a formula set in advance, instead of using such a correction information map. As the value of the threshold value TAX decreases, the response speed of the assist motor 216 when starting to pedal the bicycle 201 from a state in which the crank 212 is stopped increases. That is, the time needed for the output of the assist motor 216 to reach the base running assist force PA becomes shorter. If the threshold value TAX is decreased, the output of the assist motor 216 with respect to the manual drive force is increased early. As a result, improving traction controllability becomes possible; if the threshold value TAX is increased, the time needed to increase the output of the assist motor 216 with respect to the manual drive force increases, making the suppression of a sudden start when starting to pedal possible.

The correction information map can have the rotational angle TA and the correction coefficient can be in a linear function-like relationship as shown by the line L1 in FIG. 24, or they can be an $n^{th}$-degree polynomial function curve, as shown by lines L2 and L3 in FIG. 24. The correction information map can be configured so that the correction coefficient is a prescribed numerical value instead of 0 when the rotational angle TA is 0 degrees, as shown by line L4 in FIG. 24. In the correction information map, the correction coefficient can change continuously according to the rotational angle TA, as shown by lines L1-L4 in FIG. 24, or the correction coefficient can change discontinuously in a step-wise manner according to the rotational angle TA, as shown by line L5 in FIG. 24. This kind of correction map is determined by experiment. The controller 4 is configured to comprise a plurality of correction information maps so that the operating unit 218 is able to set a plurality of correction information maps. The controller 4 can calculate the running assist force PX by a formula that is set in advance, rather than a correction control map.

The controller 4 controls the running assist force PX so that, when the manual drive force is reduced, the decrease in the running assist force PX is delayed with respect to this reduction in the manual drive force as the second correction operation. Specifically, the controller basically causes the assist motor 216 to output a base running assist force PA that is set according to the manual drive force as the running assist force PX when the first correction operation and the second correction operation are not being conducted. Then, the controller 4 corrects the base running assist force PS when the manual drive force is reduced and causes the assist motor 216 to output the corrected base running assist force PA as the running assist force PX. This corrected base running assist force PA becomes equal to or greater than the base running assist force PA before correction. The controller delays the decrease in the running assist force PX with respect to the reduction in the manual drive force by this correction operation. Here, the base running assist force PA, which is set according to the manual drive force, and the temporal changes in the base running assist force PA are described.

Figure 25:
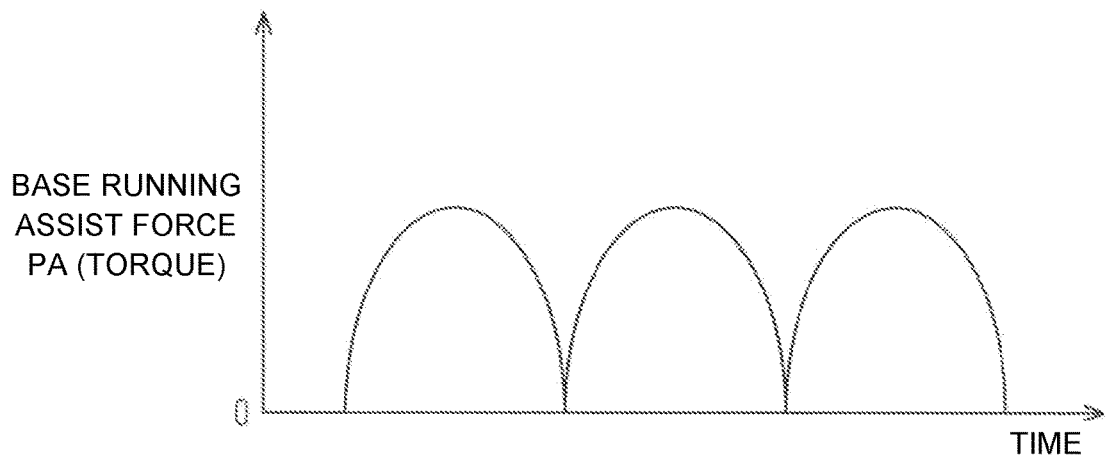
FIG. 25 is a graph showing a temporal change in a base running assist force.

FIG. 25 is a graph showing the temporal change in the base running assist force PA. The manual drive force becomes minimal when the pedal 211 is positioned at the top dead center or the bottom dead center; when the pedal 211 is positioned rotated 90 degrees from the top dead center or the bottom dead center, the manual drive force becomes the maximum. Since the base running assist force PA is set to a prescribed multiple of the manual drive force, the temporal change in the base running assist force PA will have a waveform such as shown in FIG. 25. When the controller 4 does not conduct a first correction operation and a second correction operation, the assist motor 216 will output the base running assist force PA.

The controller 4 causes the assist motor 216 to output the above-described base running assist force PA as the running assist force PX while correcting the base running assist force PA when the manual drive force is reduced; the controller causes the assist motor 216 to output the corrected base running assist force PA as the running assist force PX.

Specifically, the controller 4 converts the signal that is output by the first detector 2 into a discrete signal. That is, the controller 4 obtains information regarding the manual drive force that is detected by the first detector 2 at prescribed time intervals. Then, when a determination is made that the manual drive force that is detected by the first detector 2 is less than the manual drive force that was detected at a single moment prior, based on the discrete signal, the controller 4 determines that the manual drive force has been reduced.

Figure 26:
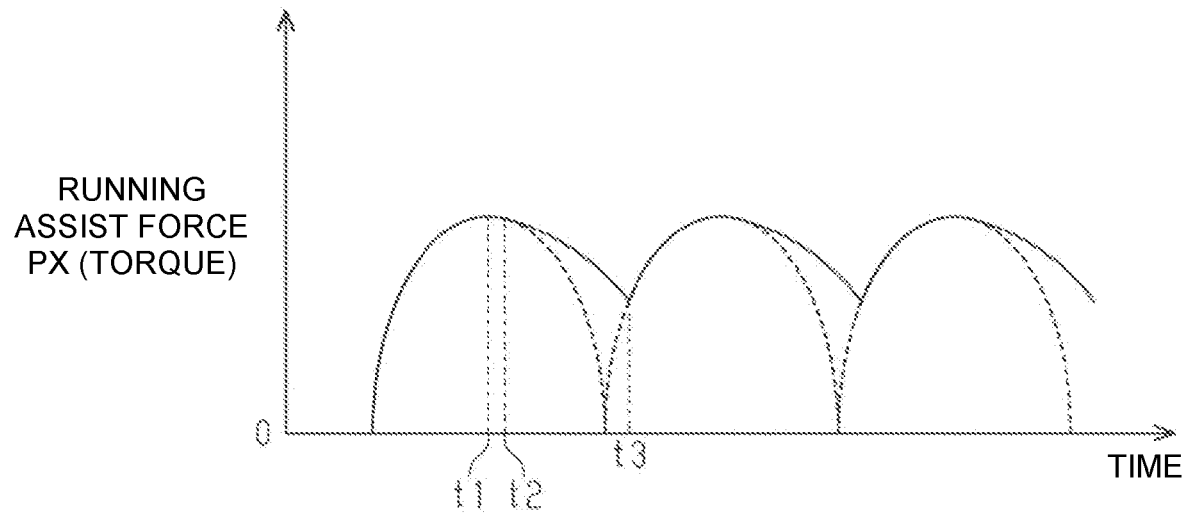
FIG. 26 is a graph showing a temporal change in a running assist force.

FIG. 26 is a graph showing the temporal change in the running assist force PX. The waveform shown by the solid line in FIG. 26 indicates the temporal change in the running assist force PX, and the waveform shown by the dashed line indicates the temporal change in the base running assist force PA. As shown in FIG. 26, the controller 4 determines that the manual drive force has been reduced at a time t2 after the time t1. Time t1 is a time at which the base running assist force PA displays the maximum value.

When a determination is made that the manual drive force has been reduced, the controller 4 delays the decrease in the running assist force with respect to the reduction in the manual drive force. Specifically, the controller 4 uses a primary low-pass filter to correct the base running assist force PA and obtains the running assist force PX. The reduction of the running assist force PX is delayed with respect to the decrease in the manual drive force, with the controller 4 correcting the base running assist force PA using a primary low-pass filter in this way.

Additionally, after starting the operation to correct the base running assist force PA, the controller 4 continues the operation to correct the base running assist force PA as long as the corrected running assist force PX is greater than the base running assist force PA before correction. That is, the controller 4 continues the operation to correct the base running assist force PA between time t2 and time t3 in FIG. 26. The controller 4 then stops the second correction operation when the base running assist force PA before correction becomes equal to or greater than the corrected running assist force PX at time t3.

The controller 4 also controls the delay in the reduction of the running assist force PX described above according to the rotational state of the crank 212. In particular, regarding the time constant of the primary low-pass filter that is used for the correction operation described above, the controller 4 sets a time constant corresponding to the rotational state of the crank 212. The response speed of the assist motor 216 when the manual drive force is decreased increases as the time constant decreases, and the response speed of the assist motor 216 when the manual drive force is decreased also decreases as the time constant increases.

Specifically, in a first control state described below, the controller 4 sets the time constant to be greater as the rotational speed KA of the crank 212 increases or the rotation period of the crank 212 decreases. As a result, the delay in the reduction of the running assist force PX decreases as the rotational speed KA decreases or as the rotation period increases, and the delay in the reduction of the above-described running assist force PX increases as the rotational speed KA decreases or the rotation period decreases. In the first control state, the duration of the assisting force decreases as the rotational speed KA decreases, and generating an assisting force that is synchronized with the manual drive force becomes possible. The traction controllability during low rotational speed KA traveling thereby improves.

Additionally, in a second control state described below, the controller 4 sets the time constant to be smaller as the rotational speed KA of the crank 212 increases or as the rotation period of the crank 212 decreases. As a result, the delay in the reduction of the running assist force PX decreases as the rotational speed KA increases or as the rotation period decreases. In the second control state, the time constant decreases as the rotational speed KA increases, that is, as the traveling speed becomes higher, so that the duration of the assisting force, that is, the time needed to drive the assist motor 216, decreases, making the consumption of power more difficult. Consequently, increasing the cruising distance in a high-speed range becomes possible. Also, in the second control state, the time constant increases as the rotational speed KA decreases, that is, as the traveling speed becomes slower, so that the duration of the assisting force increases, and suppressing a reduction in the vehicle speed becomes possible.

Figure 27:
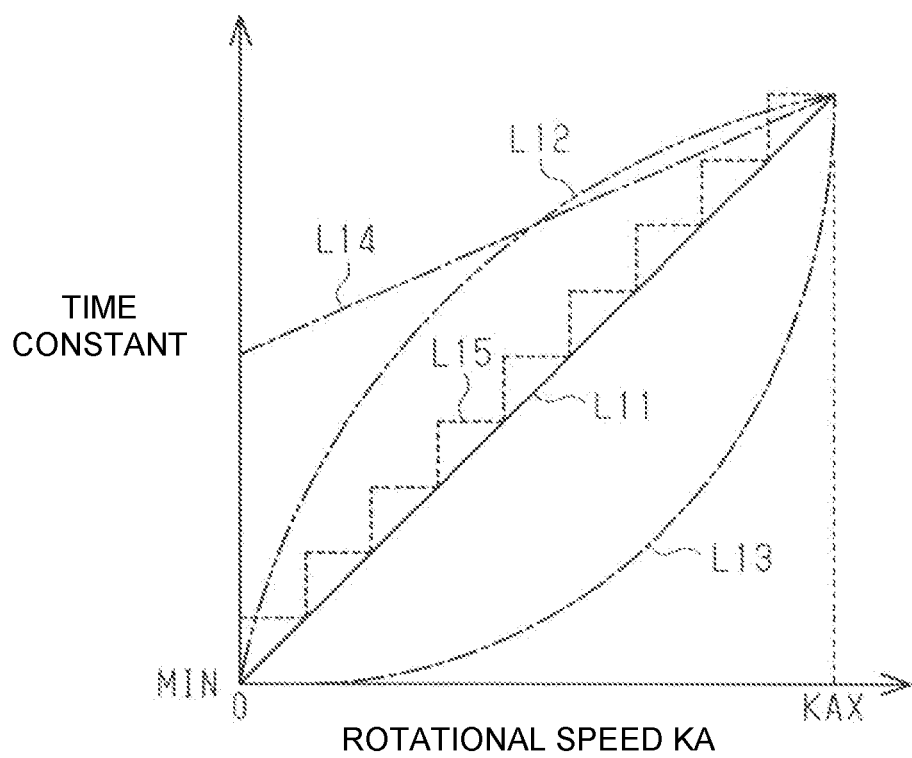
FIG. 27 is a time constant map showing a relationship between a time constant and cadence in a first control state.
Figure 28:
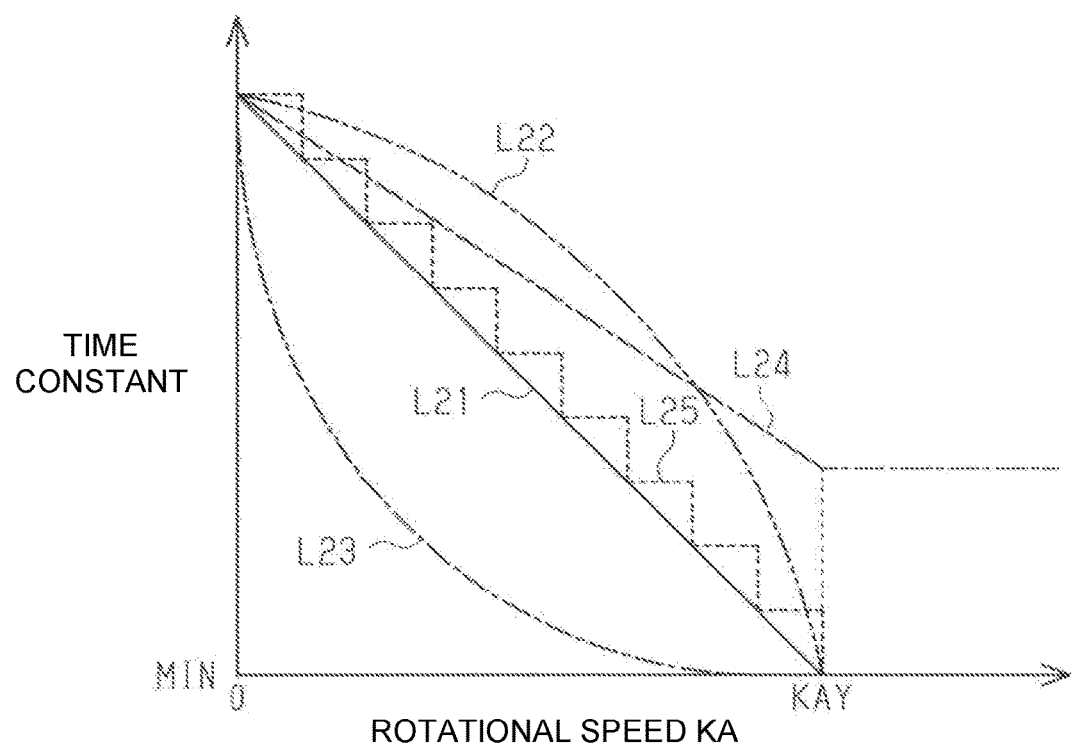
FIG. 28 is a time constant map showing a relationship between a time constant and cadence in a second control state.

For example, the controller 4 stores a time constant map such as that shown in FIG. 27 and FIG. 28 and sets the time constant based on this time constant map. The time constant map shown in FIG. 27 is used in the first control state. The time constant map shown in FIG. 27 includes information that correlates the time constant and the rotational speed KA, where the time constant decreases as the rotational speed KA increases. Additionally, when the rotational speed KA is equal to or greater than a prescribed value KAX, the time constant is correlated to become the minimum value. That is, the controller 4 does not conduct a correction of the running assist force PX by the second correction operation when the rotational speed KA is equal to or greater than a prescribed value. Meanwhile, the value of one control cycle of the controller can be employed as the minimum time constant.

The time constant map shown in FIG. 28 is used in the second control state. The time constant map shown in FIG. 28 includes information that correlates the time constant and the rotational speed KA, where the time constant increases as the rotational speed KA increases. Additionally, when the rotational speed KA is equal to or greater than a prescribed value KAY, the time constant is correlated to become a maximum constant value. The controller 4 can also calculate a time constant corresponding to the rotational speed KA by a formula set in advance instead of using such a time constant map. The prescribed value KAY and the prescribed value KAX can match. The prescribed value KAY can also be different from the prescribed value KAX.

In the time constant map, the relationship between the time constant and the rotational speed KA can be a linear function relationship, such as that shown by the line L11 in FIG. 27, as well as the line L21 in FIG. 28; or this can be an $n^{th}$-degree polynomial function relationship, such as that shown by the lines L12 and L13 in FIG. 27, as well as the lines L22 and L23 in FIG. 28. Additionally, as shown by the line L14 in FIG. 27, the time constant can become a numerical value greater than the minimum when the rotational speed KA is 0. As shown by the line L24 in FIG. 28, the time constant can become a numerical value greater than the minimum when the rotational speed KA is a prescribed value KAY. The time constant map can be configured so that the time constant will continuously change according to the change in the rotational speed KA, as shown by the lines L11-L14 in FIG. 27 and the lines L21-L24 in FIG. 28, or this map be configured so that the time constant will change discontinuously in a stepwise manner according to the change in the rotational speed KA, as shown by L15 in FIG. 27 and as shown by L25 in FIG. 28. This kind of time constant map is determined by experimentation. The controller 4 can comprise a plurality of time constant maps, and a plurality of time constant maps can be selected by the operating unit 218 or an external device 7.

As shown in FIG. 23, in addition to the assisting condition, the controller 4 can also selectively set a first control state and a second control state that have output characteristics of the assist motor 216 with respect to the manual drive force that are different from each other. The first control state is, for example, an off-road mode. The second control state is, for example, an on-road mode. The off-road mode is a mode suitable for traveling on a road surface with large temporal variations in the traveling load, such as rocky roads and dirt roads. The on-road mode is a mode suitable for traveling on a road surface with small temporal variations in the traveling load, such as paved roads. The temporal variation in the traveling load is the temporal change in the tangential force between the wheel and the road surface. The maximum values of the output of the assist motor 216 with respect to the manual drive force are the same for the first control state and the second control state.

The first control state and the second control state can be selectively set by the operating unit 218. The operating unit 218 comprises a first operating switch that corresponds to the first control state and a second operating switch that corresponds to the second control state. The controller 4 enters the first control state by operating the first operating switch, and the controller 4 enters the second control state by operating the second operating switch. The operating unit 218 can be configured to comprise one operating switch that is operated to alternately switch between the first control state and the second control state.

The communication unit 5 can also be provided to the bicycle control apparatus 1. In this case, the first control state and the second control state can be set via the communication unit 5. The communication unit 5 is configured to communicate with an external device 7. The external device 7 is, for example, a personal computer, a smartphone, etc. The communication unit 5 comprises a wired or a wireless interface and performs wired or wireless communication with the external device 7. When achieving a wired connection between the communication unit 5 and an external device, a connection port can be provided to a housing of the drive unit 219 or to the operating unit 218.

The controller 4 controls the output (the running assist force PX) of the assist motor 216 so that the response speed of the assist motor 216 with respect to changes in the manual drive force in the first control state will be faster than the response speed of the assist motor 216 with respect to changes in the manual drive force in the second control state when the bicycle crank 212 is rotated from a stopped state and/or when the rotational speed KA of the crank 212 is less than or equal to a prescribed first speed. The controller 4 differentiates the running assist force PX that the assist motor 216 outputs in the first control state and the running assist force PX that the assist motor 216 outputs in the second control state when the bicycle crank 212 rotates from a stopped state and/or when the rotational speed KA of the crank 212 is less than or equal to a prescribed first speed. In other words, the controller 4 differentiates that the output state of the assist motor 216 is the first control state and that the output state of the assist motor 216 is the second control state when the bicycle crank 212 rotates from a stopped state and/or when the rotational speed KA of the crank 212 is less than or equal to a prescribed first speed. Meanwhile, differentiating the output state means that cases are included in which the running assist force PX that is output when detecting the same manual drive force becomes a different size, depending on whether the output state is the first control state or the second control state; this can also include cases in which the same running assist force PX is output with respect to a part of the manual drive force.

In particular, the controller 4 controls the output of the assist motor 216 according to the first control state and the second control state, as described in the following (a) to (c).

(a) When the bicycle crank 212 is rotated from a stopped state, the controller 4 controls the output of the assist motor so that the response speed of the assist motor 216 when the manual drive force in the first control state increases will be faster than the response speed of the assist motor 216 when the manual drive force in the second control state increases.

(b) When the rotational speed KA of the crank 212 is less than or equal to a prescribed first speed, the controller 4 controls the output of the assist motor so that the response speed of the assist motor 216 when the manual drive force in the first control state decreases will be less than or equal to the response speed of the assist motor 216 when the manual drive force in the second control state decreases.

(c) When the rotational speed KA of the crank 212 exceeds a prescribed second speed, which is equal to or greater than the prescribed first speed, the controller 4 controls the output of the assist motor so that the response speed of the assist motor 216 when the manual drive force in the first control state decreases will be slower than the response speed of the assist motor 216 when the manual drive force in the second control state decreases.

Figure 29:
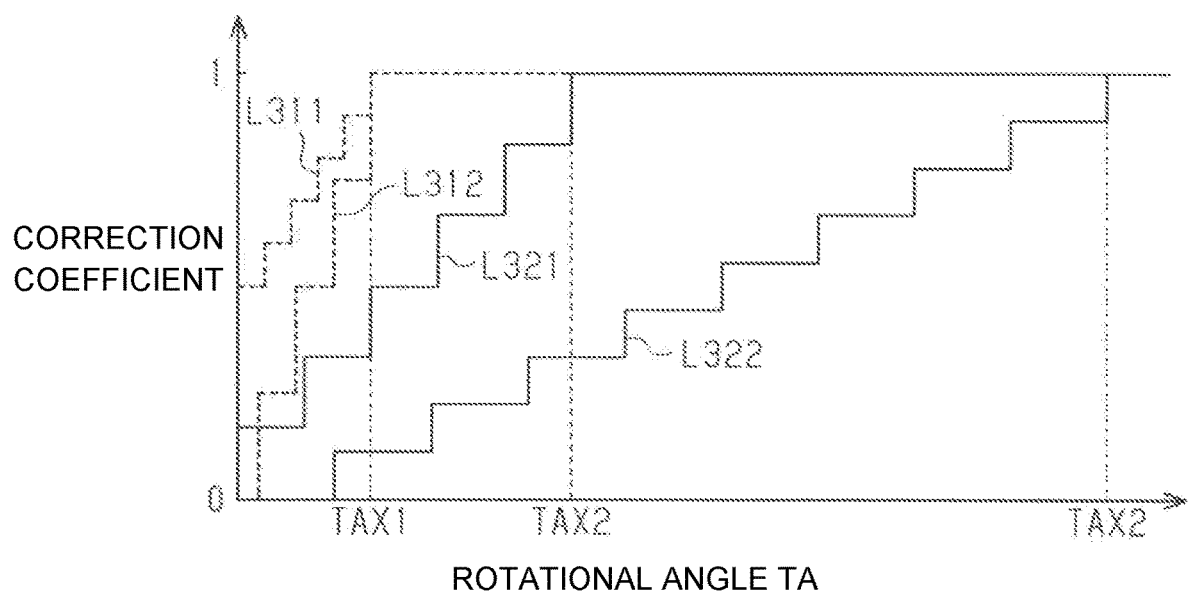
FIG. 29 is a correction coefficient map showing an association between a correction coefficient and a rotational angle in a first control state and a second control state.

In order to control the output of the assist motor 216 as described in (a) above, the controller 4 switches the correction information map or the formula that is used for the first correction operation between when in the first control state and the second control state. The controller 4 uses, for example, a correction information map such as that shown in FIG. 29 in the first correction operation. The dotted line L311 in FIG. 29 shows a correction information map that is used in the first correction operation when in the first control state. The solid line L321 in FIG. 29 shows a correction information map that is used in the first correction operation when in the second control state. In the first control state, the correction coefficient is set to be 1 when the rotational angle TA reaches a first rotational angle TAX1, which is the threshold value TAX. The first rotational angle TAX1 is, for example, 30 degrees. In the second control state, the correction coefficient is set to be 1 when the rotational angle TA reaches a second rotational angle TAX2, which is the threshold value TAX. The second rotational angle TAX2 is, for example, 60 degrees or 720 degrees. The first rotational angle TAX1 is smaller than the second rotational angle TAX2.

The controller 4 can switch the correction information map or the formula that is used in the first correction operation according to the traveling speed ZA of the bicycle 201. In this case, the controller 4 controls the output of the assist motor 216 so that the response speed of the assist motor 216 when the manual drive force increases will be faster when the traveling speed ZA is equal to or greater than a prescribed speed, as compared to when the traveling speed ZA is less than or equal to the prescribed speed.

For example, in the first correction operation in the first control state, when the traveling speed ZA is less than or equal to a prescribed speed ZX, the controller 4 uses a correction information map such as that shown by the dotted line L311 in FIG. 29; when the traveling speed ZA is less than or equal to the prescribed speed ZX, the controller 4 uses a correction information map such as that shown by the dotted line L312 in FIG. 29. In the correction information map of FIG. 29, if the traveling speed ZA is less than or equal to the prescribed speed ZX, the correction coefficient is set to be 1 when the crank 212 is rotated, for example, 30 degrees, from a stopped state. With the correction information map shown by the dotted line L311 and the correction information map shown by the dotted line L312, the first rotational angle TAX1 at which the correction coefficient becomes 1 will be the same. However, with respect to the rotational angle TA until the correction coefficient becomes 1, the correction coefficient will be larger in the correction information map shown by the dotted line L312 than in the correction information map shown by the dotted line L311.

For example, in the first correction operation in the second control state, when the traveling speed ZA is less than or equal to a prescribed speed ZX, the controller 4 uses a correction information map such as that shown by the solid line L321 in FIG. 29; when the traveling speed ZA is less than or equal to the prescribed speed ZX, the controller 4 uses a correction information map such as that shown by the solid line L322 in FIG. 29. In the correction information map of FIG. 29, if the traveling speed ZA is less than or equal to the prescribed speed ZX, the correction coefficient is set to be 1 when the crank 212 is rotated, for example, 60 degrees, from a stopped state.

For example, 3 km per hour is selected as the prescribed speed ZX. When the crank 212 is rotated from a stopped state when the traveling speed ZA is less than or equal to the prescribed speed ZX, the state is assumed to be one in which the bicycle 201 has started to move from a stopped state or a substantially stopped state. When the crank 212 is rotated from a stopped state when the bicycle 201 exceeds a prescribed speed ZX, the assumption can be that the bicycle 201 is in a coasting state. Starting the output of the assist motor 216 according to the running state of the bicycle 201 is possible with the controller 4 changing the correction information map.

When the bicycle crank 212 is rotated from a stopped state, if the crank is rotated at the same speed by applying the same manual drive force to the crank, the output of the assist motor 216 will be faster and greater when in the first control state, as compared to when in the second control state. That is, the response speed of the assist motor increases.

Figure 30:
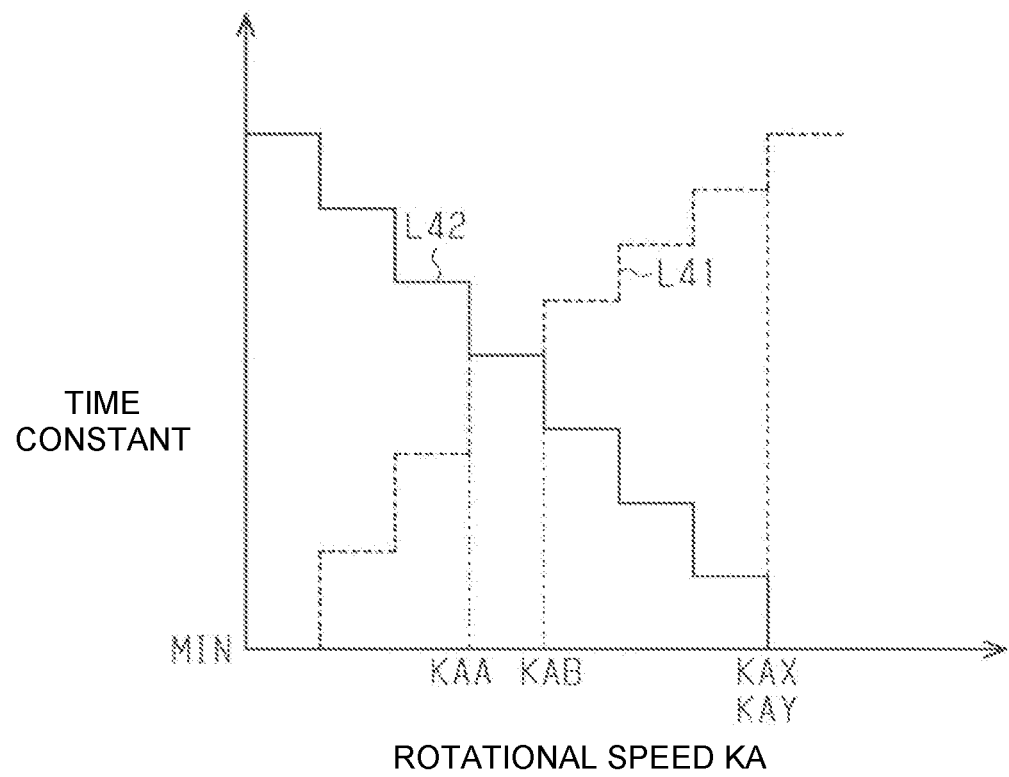
FIG. 30 is a graph showing a relationship between time constant and cadence in a first control state and a second control state.

In order to control the output of the assist motor 216 as described in (b) and (c) above, the controller 4 switches the correction information map or the formula that is used for the second correction operation between when in the first control state and the second control state. The controller 4 uses, for example, a correction information map such as that shown in FIG. 30 in the second correction operation. The dotted line L41 in FIG. 30 shows a correction information map that is used in the second correction operation when in the first control state. The solid line L42 in FIG. 30 shows a correction information map that is used in the second correction operation when in the second control state. In the example shown in FIG. 30, regardless of when in the first control state or the second control state, if the time constant becomes the same within a prescribed rotational speed KA range (KAA-KAB). The prescribed rotational speed KA range is, for example, 50 rpm-60 rpm. In the example shown in FIG. 30, the rotational speed KAA is a prescribed first speed, and the rotational speed KAB is a prescribed second speed.

Figure 31:
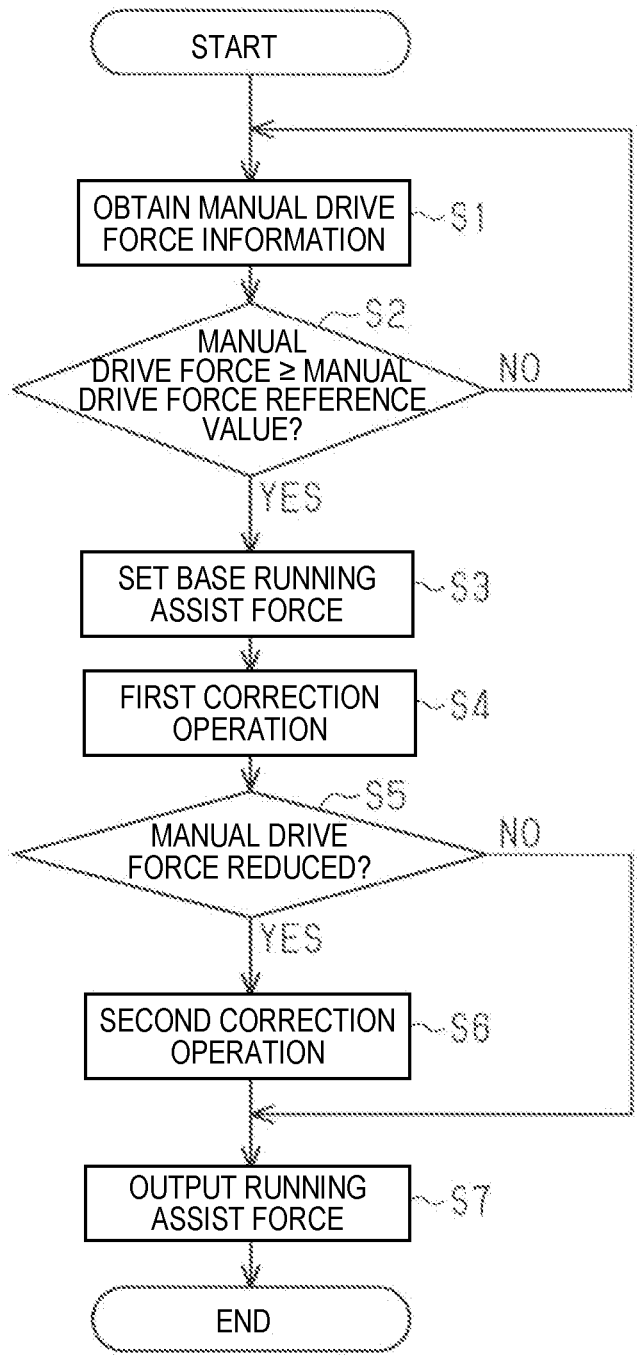
FIG. 31 is a flowchart showing a control operation that is executed by the bicycle control apparatus in accordance with the fifth embodiment.

Next, the operation of the bicycle control apparatus 1 described above will be explained, with reference to FIG. 31. FIG. 31 is a flow chart that illustrates a control operation executed by the bicycle control apparatus 1.

When power is supplied to the bicycle control apparatus 1, the operation proceeds to step S1 in FIG. 31, and the controller 4 obtains information regarding the manual drive force that is detected by the first detector 2. Specifically, the controller 4 obtains information regarding the torque that is detected by the first detector 2.

Next, the operation proceeds to step S2, and the controller 4 determines whether or not the manual drive force is equal to or greater than the manual drive force reference value. Specifically, the controller 4 determines whether or not the torque is equal to or greater than a torque reference value, based on the obtained information regarding the torque. Meanwhile, while not particularly limited, this torque reference value can be made to be, for example, equal to or greater than 7 N·m and less than or equal to about 10 N·m. The controller 4 proceeds to the operation of step S1 when a determination is made that the manual drive force is less than the manual drive force reference value.

If a determination is made in step S2 that the manual drive force is equal to or greater than the manual drive force reference value, the controller 4 proceeds to step S3. In step S3, the controller 4 sets the base running assist force PA. Specifically, the controller 4 sets a base running assist force PA corresponding to the manual drive force.

Next, the first correction operation is performed in step S4. The controller 4 corrects the base running assist force PA according to the angle (the rotational angle TA) of the crank 212 from the stopped state, using a correction coefficient that corresponds to the control state that is set or that is selected. The controller 4 does not correct the base running assist force PA when the angle of the crank 212 from the stopped state becomes equal to or greater than a threshold value TAX.

Next, the operation proceeds to step S5, and the controller 4 determines whether or not the manual drive force is decreasing. If a determination is made in step S5 that the manual drive force is decreasing, the controller 4 proceeds to step S6.

In step S6, the controller 4 performs the second correction operation. The controller 4 corrects the base running assist force PA (the running assist force PX) that was corrected in step S4 or the base running assist force PA that has not been corrected using a time constant that corresponds to the control state that is set or that is selected and then proceeds to step S7. If a determination is made in step S5 that the manual drive force is not decreasing, the controller 4 proceeds to step S7.

In step S7, the controller 4 controls the assist motor 216 based on the base running assist force PA (the running assist force PX) that was corrected in step S4 and step S6, the base running assist force PA (the running assist force PX) that was corrected in step S4, or the base running assist force PA that has not been corrected. When step S7 has been completed, the operation returns to step S1 and continues to execute the operation of the flowchart until the supply of power to the controller 4 is interrupted.

The bicycle control apparatus 1 performs the following actions and obtains the following effects.

(1) The demand on the assist motor 216 differs depending on the traveling conditions of the bicycle 201, for example, between when the bicycle 201 is traveling on-road and when traveling off-road. For this reason, a control of the assist motor 216 that corresponds to the traveling conditions of the bicycle 201 is required.

The controller 4 is able to control the assist motor 216 by selectively setting the first control state and the second control state. As a result, controlling the assist motor 216 corresponding to the traveling conditions of the bicycle 201 is possible.

(2) When the rotational speed KA is less than or equal to a prescribed first speed, the controller 4 controls the output of the assist motor 216 so that the response speed of the assist motor 216 with respect to changes in the manual drive force in the first control state will be faster than the response speed of the assist motor 216 with respect to changes in the manual drive force in the second control state.

Accordingly, in the first control state, driving the assist motor 216 with respect to the manual drive force, good tracking is possible. For this reason, for example, when trying to climb over an obstacle while traveling off-road, if the manual drive force is increased, the output of the assist motor 216 is immediately increased; when the manual drive force is decreased, the output of the assist motor is immediately decreased. Accordingly, the traction controllability is improved. Additionally, when the manual drive force is decreased, the output of the assist motor 216 and the output time can be reduced, so that the power consumption can be reduced. On the other hand, in the second control state, the variation of the torque by the assist motor 216 is reduced. For this reason, the discomfort that is caused by a fluctuation in the assisting force when traveling on a flat paved road is likely to be imparted on the rider.

(3) When the crank 212 is rotated from the stopped state, that is, when in an area in which the rotational angle TA is small, the controller 4 controls the output of the assist motor 216 so that the response speed of the assist motor 216 with respect to the changes in the manual drive force in the first control state will be faster than the response speed of the assist motor 216 with respect to the changes in the manual drive force in the second control state. That is, the period during which the base running assist force PA is corrected to a running assist force PX that is less than the base running assist force PA will be shorter when in the first control state as compared to when in the second control state.

Accordingly, in the first control state, the running assist force PX with respect to the manual drive force increases quickly to the base running assist force PA, so that, for example, the traction controllability improves when the bicycle 201 is traveling off-road. On the other hand, in the second control state, the running assist force PX with respect to the manual drive force slowly increases to the base running assist force, as compared to the first control state; as a result, there are cases in which discomfort that is imparted on the rider from, for example, the traveling speed ZA increasing rapidly at the time of starting to run the bicycle 201 is reduced.

(4) For example, a large amount of power (energy) is required when traveling off-road while maintaining the speed to a certain degree. There is a risk that simply increasing the upper limit torque set value in order to obtain a large amount of power will lead to an increase in the size and weight of the motor unit and the mechanism portion of the drive unit 216. Additionally, increasing the assist ratio, which is the ratio of the output of the assist motor with respect to the manual drive force, will consume more power. When the rotational speed KA exceeds a prescribed second speed, the controller 4 controls the output of the assist motor so that the response speed of the assist motor when the manual drive force in the first control state decreases will be slower than the response speed of the assist motor when the manual drive force in the second control state decreases. The reduction in the assisting force is thereby suppressed even if the manual drive force is reduced; as a result, increasing the power without changing the size and the weight of the drive unit 219 becomes possible, and effectively utilizing the electric power becomes possible.

Modified Example of Fifth Embodiment

The specific forms that the bicycle control apparatus can take are not limited to the forms illustrated in the fifth embodiment. The bicycle control apparatus can take various forms that are different from the fifth embodiment. The modified example of the fifth embodiment shown below is one example of the various forms that the bicycle control apparatus, etc. can take.

The controller 4 performs the second correction operation after the first correction operation, but the controller 4 can perform the first correction operation after performing the second correction operation.

In the fifth embodiment, the controller 4 can correct the manual drive force that is detected by the first detector 2 instead of correcting the base running assist force PA. That is, instead of directly correcting the base running assist force PA, the controller 4 can indirectly correct the base running assist force PA by correcting the manual drive force that is detected by the second detector 3.

The first detector 2 detects the torque that acts on the crankshaft 212A as the manual drive force but is not limited thereto. For example, the first detector 2 can detect the tensile force that acts on the chain 210 as the manual drive force or the force that acts on the axle of the rear wheel 207 or the drive force that acts on the frame 202 by manual force.

A configuration is used in which a supplemental drive force acts on the power transmission path by the assist mechanism 215, but the present invention is not limited thereto. For example, the configuration can be such that supplemental drive force acts on the chain 210 by the assist mechanism 215. Additionally, for example, the present bicycle control apparatus can also be applied to an electrically assisted bicycle comprising a front hub motor, that is, an electrically assisted bicycle in which the front wheel 206 comprises an assist mechanism. Besides the above, the present bicycle control apparatus can also be applied to an electrically assisted bicycle comprising a rear hub motor, that is, an electrically assisted bicycle in which the rear wheel 207 comprises an assist mechanism.

The controller 4 can perform the first correction operation using the travel distance or the travel time from when the crank 212 of the bicycle 201 starts to rotate, instead of the rotational speed KA.

In the map shown in FIG. 30, when the rotational speed KA is greater than the rotational speed KAB, maintaining the line L42 at a time constant of a constant value, for example, the time constant at the time of rotational speed KAB, is possible. In this case, in the second control state, variation of the torque is suppressed even in a high-speed range. Consequently, the discomfort that is caused by a fluctuation in the torque is less likely to be imparted on the rider, even in a high-speed range. Additionally, maintaining a constant traveling speed ZA even in a high-speed range becomes easier.

The controller 4 executes all of the controls of (a), (b), and (c), but the configuration can be such that the controller 4 executes at least one control from among (a), (b), and (c). Additionally, the configuration can be such that the operating unit 218 and/or the external device 7 selects controls from (a), (b), and (c) to be executed by the controller 4.

The response speed of the assist motor 216 can be made to be adjustable by the operating unit 218 or the external device 7. In this case, the correction coefficient and the time constant can be selected or set by the operating unit 218 or the external device 7. As a result, controlling the assist motor 216 according to the preference of the rider becomes possible.

The controller 4 is set to be able to change the assisting condition via an operation of the operating unit 218, but the assisting condition can be made to be unchangeable. In this case, setting a running assist force PX that is a preset multiple of the manual drive force as the base running assist force PA is possible.

The controller 4 sets a correction coefficient according to the rotational angle TA of the crank 212 when the crank 212 is rotated from a stopped position. However, the controller 4 can delay the increase in the running assist force PX with respect to an increase in the manual drive force regardless of the rotation of the crank 212 when the crank 212 is rotated from a stopped state. In this case, the controller 4 corrects the base running assist force PA using a primary low-pass filter. Changing the response speed of the assist motor 216 with respect to changes in the manual drive force is possible by delaying the increase in the running assist force PX with respect to the increase in the manual drive force.

The controller 4 can be configured (i.e., programmed) to not correct the base running assist force PA when the crank 212 is rotated from the stopped position in the first control state. Additionally, the controller 4 can be configured (i.e., programmed) to not correct the base running assist force PA when less than or equal to the first traveling speed in the first control state. In this case, the assist motor 216 can respond more directly to the manual drive force.

Below, additional matters based on the matters described in the fifth embodiment and the modified example thereof will be described.

In accordance with a first example, a bicycle control apparatus comprising a controller for controlling an output of an assist motor according to a manual drive force, wherein the controller is able to selectively set a first control state and a second control state, in which the output states of the assist motor with respect to the manual drive force are different from each other; the controller controls the output of the assist motor so that a response speed of the assist motor with respect to changes in the manual drive force in the first control state will be faster than the response speed of the assist motor with respect to changes in the manual drive force in the second control state when a crank of a bicycle rotates from a stopped state and/or when a rotational speed of the crank is less than or equal to a prescribed first speed.

In accordance with a second example, the bicycle control apparatus as recited in first example, wherein the controller controls the output of the assist motor so that the response speed of the assist motor when the manual drive force increases in the first control state will be faster than the response speed of the assist motor when the manual drive force increases in the second control state when the bicycle crank rotates from a stopped state.

In accordance with a third example, the bicycle control apparatus as recited in the first example or the second example, wherein the controller controls the output of the assist motor so that the response speed of the assist motor when the manual drive force decreases in the first control state will be faster than the response speed of the assist motor when the manual drive force decreases in the second control state when the rotational speed of the crank is less than or equal to a prescribed first speed.

In accordance with a fourth example, the bicycle control apparatus as recited in the first example or the second example, wherein the controller controls the output of the assist motor so that the response speed of the assist motor when the manual drive force decreases in the first control state will be slower than the response speed of the assist motor when the manual drive force decreases in the second control state when the rotational speed of the crank exceeds a prescribed second speed, which is equal to or greater than a prescribed first speed.

In accordance with a fifth example, the bicycle control apparatus as recited in any one of first to fourth examples, further comprising an operating unit that can be attached to a bicycle, wherein the controller selectively sets the first control state and the second control state with the operating unit.

In accordance with a sixth example, the bicycle control apparatus as recited in any one of the first to fifth examples, further comprising a communication unit that is able to communicate with an external device, wherein the controller selectively sets the first control state and the second control state with the external device.

In accordance with a seventh example, the bicycle control apparatus as recited in the sixth example, wherein the controller is able to adjust the response speed with the operating unit.

In accordance with an eighth example, the bicycle control apparatus as recited in the sixth example, wherein the controller is able to adjust the response speed with an external device.

In accordance with a ninth example, a bicycle control apparatus comprising a controller for controlling an output of an assist motor according to a manual drive force, wherein the controller is able to selectively set a first control state and a second control state, in which the maximum values of the output of the assist motor with respect to the manual drive force are the same and in which the output states of the assist motor with respect to the manual drive force are different from each other; the controller controls the output of the assist motor so that the output of the assist motor with respect to the manual drive force in the first control state will be different from the output of the assist motor with respect to the manual drive force in the second control state when a crank of a bicycle rotates from a stopped state and/or when the rotational speed of the crank is less than or equal to a prescribed first speed.

In accordance with a tenth example, the bicycle control apparatus as recited in Appendix 9, wherein the controller reduces the output of the assist motor until a rotational angle of the crank reaches a first prescribed value when the crank rotates from a stopped state in the first control state and reduces the output of the assist motor until the rotational angle of the crank reaches a second prescribed value, which is greater than the first prescribed value, when the crank rotates from a stopped state in the second control state.

In accordance with an eleventh example, a bicycle control apparatus for controlling a bicycle that has an assist motor, comprising a controller for controlling a running assist force that the assist motor outputs according to at least either the rotational angle of the crank, based on a position of the bicycle crank at a point in time in which the running assist is initiated by the assist motor, a travel distance from the point in time in which the running assist is initiated, or a travel time from the point in time at which the running assist is initiated, wherein the controller is able to selectively set a first control state and a second control state in which the outputs of the assist motor with respect to the manual drive force are different from each other; the controller differentiates the running assist force that the assist motor outputs in the first control state and the running assist force that the assist motor outputs in the second control state.

In accordance with a twelfth example, a bicycle control apparatus for controlling a bicycle that has an assist motor, comprising a controller for controlling a running assist force that the assist motor outputs according to a manual drive force, wherein the controller controls the running assist force so that a reduction in the running assist force with respect to a reduction in the manual drive force is delayed when the manual drive force is decreased and controls the delay in the reduction of the running assist force according to a rotational state of a crank; the controller is able to selectively set a first control state and a second control state in which the outputs of the assist motor with respect to the manual drive force are different from each other, and the controller differentiates the delay in the reduction of the running assist force in the first control state and the delay in the reduction of the running assist force in the second control state.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle control apparatus comprising:
   a controller, the controller including a processor, a memory, and an I/O interface; and
   a communication unit connected to the controller and arranged to communicate with an external device,
   the controller being configured to communicate with an assist mechanism including an assist motor arranged to impart a running assist force as a supplemental drive force to a bicycle, the controller being configured to set the running assist force to a base running assist force or to a value obtained by applying a correction to the base running assist force, the controller determining the base running assist force based on a manual drive force imparted to the bicycle by a rider, and
   the controller being programmed to set a control state and to adjust a response speed of the assist motor based on an operation of the external device, the response speed being a speed with which an output of the assist motor changes in response to a change in a manual drive force of the bicycle and corresponding to a time needed for the running assist force to reach the base running assist force during the correction.

2. The bicycle control apparatus according to claim 1, wherein the communication unit has a wireless interface and performs wireless communication with the external device.

3. The bicycle control apparatus according to claim 1, wherein
the external device includes a smartphone, and
the communication unit has a wireless interface and performs wireless communication with the smartphone.

4. The bicycle control apparatus according to claim 1, wherein
a correction coefficient and a time constant can be selected or set with the external device, the correction coefficient being used to execute the correction of the base running assist force and the time constant being used to define the response speed of the assist motor.

5. The bicycle control apparatus according to claim 1, wherein
the controller is programmed to alternately set a first control state or a second control state as the control state, and to control the assist motor such that an output state of the assist motor with respect to the manual drive force of the bicycle is different in the first control state than in the second control state.

6. The bicycle control apparatus according to claim 5, further comprising
an operating device configured to be operated by a user, the controller being arranged and programmed to communicate with the operating device and alternately set the first control state or the second control state in response to operation of the operating device.

7. The bicycle control apparatus according to claim 5, wherein
the controller is programmed to selectively set the first control state or the second control state in response to operation of an operating device.

8. The bicycle control apparatus according to claim 1, wherein
the response speed is a speed at which the assist motor responds to a decrease of the manual drive force.

9. The bicycle control apparatus according to claim 1, wherein
the response speed is a speed at which the assist motor responds to an increase of the manual drive force.

10. The bicycle control apparatus according to claim 1, wherein
the correction includes a first correction operation that starts when a crank of the bicycle is rotated from a stopped state and ends when a rotational angle of the crank reaches a prescribed threshold value, the first correction operation being configured such that the running assist force is initially smaller than the base running assist force and reaches the base running assist force when the rotational angle reaches the prescribed threshold value such that the smaller the prescribed threshold value is, the higher the response speed becomes.

11. The bicycle control apparatus according to claim 10, wherein
the first correction operation is configured to determine the running assist force as a product of the base running assist force and a correction coefficient, the correction coefficient increasing from a value smaller than 1 until becoming equal to 1 when the rotation angle reaches the prescribed threshold value.

12. The bicycle control apparatus according to claim 1, wherein
the correction includes a second correction operation that starts when the manual drive force decreases during pedaling, the second correction operation being configured such that the running assist force is larger than the base running assist force until after the manual drive force starts increasing.

13. The bicycle control apparatus according to claim 12, wherein
the second correction operation is configured to have a duration defined by a time constant, the response speed increasing as the time constant decreases and decreasing as the time constant increases.

14. The bicycle control apparatus according to claim 13, wherein
the time constant is set in accordance with a rotational speed of a crank of the bicycle.

15. The bicycle control apparatus according to claim 1, wherein
the control state being selectively set to one of a first control state and a second control state in response the operation of the external device, the response speed being different in the first control state than in the second control state.

* * * * *